United States Patent
Wu et al.

(10) Patent No.: US 12,418,191 B2
(45) Date of Patent: Sep. 16, 2025

(54) ENERGY RECOVERY USING SUPERCAPACITORS

(71) Applicant: International Engine Intellectual Property Company, LLC, Lisle, IL (US)

(72) Inventors: Shouhao Wu, South Barrington, IL (US); Weiying Yang, Buffalo Grove, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 853 days.

(21) Appl. No.: 17/698,471

(22) Filed: Mar. 18, 2022

(65) Prior Publication Data
US 2023/0299609 A1    Sep. 21, 2023

(51) Int. Cl.
*H02J 7/34* (2006.01)
*B60L 7/10* (2006.01)
*B60L 50/40* (2019.01)

(52) U.S. Cl.
CPC ............... *H02J 7/345* (2013.01); *B60L 7/10* (2013.01); *B60L 50/40* (2019.02); *H02J 2207/50* (2020.01)

(58) Field of Classification Search
CPC ..................................... H02J 7/345
USPC ......................................... 320/166
See application file for complete search history.

(56) References Cited

U.S. PATENT DOCUMENTS

| | | | |
|---|---|---|---|
| 6,177,734 B1* | 1/2001 | Masberg | B60K 28/16 290/40 C |
| 6,364,042 B1* | 4/2002 | Joachim | B60K 6/48 290/31 |
| 2006/0103358 A1* | 5/2006 | Schulte | B60L 53/11 320/166 |
| 2009/0056661 A1 | 3/2009 | Cook et al. | |
| 2010/0133025 A1* | 6/2010 | Flett | B60L 7/14 180/65.21 |
| 2011/0100735 A1 | 5/2011 | Flett | |
| 2024/0001767 A1* | 1/2024 | Lo Calzo | B60R 16/03 |

FOREIGN PATENT DOCUMENTS

| | | |
|---|---|---|
| CN | 106696721 | 5/2017 |
| DE | 10 2010 207379 | 11/2013 |

OTHER PUBLICATIONS

International Search Report and Written Opinion for PCT/US2023/011607, dated May 23, 2023 (20 pages).
"XLR Supercapacitor module," https://www.eaton.com/us/en-us/catalog/electronic-components/xlr-supercapacitor-module.html, published Jul. 24, 2018, accessed Jul. 12, 2021 (14 pages).
(Continued)

*Primary Examiner* — Jerry D Robbins
(74) *Attorney, Agent, or Firm* — Umang Khanna

(57) ABSTRACT

An electrical energy recovery, storage, and distribution system that may be used in a vehicle. The system may include a supercapacitor configured to quickly store large amounts of energy. The system may also include multiple circuits operating at different voltage levels, such that an output voltage from the supercapacitor is useful over a larger voltage range and the system is more energy efficient.

20 Claims, 14 Drawing Sheets

(56) References Cited

OTHER PUBLICATIONS

Fleet Equipment Staff, "Eaton announces supercapacitor module for electric trucks and buses," https://www.fleetequipmentmag.com/eaton-supercapacitor-module-electric-trucks-buses/, dated Oct. 8, 2018, accessed Jul. 12, 2021 (8 pages).
Eaton Supercapacitor Energy Storage Modules Reduce Long-Term Costs of Backup Power UPS Systems by Providing Longer Life Alternative to Batteries, Press Release by Eaton Corporation, https://www.eaton.com/Eaton/OurCompany/NewsEvents/NewsReleases/PCT_1597066, dated Nov. 10, 2015, accessed May 27, 2021 (1 page).
"Eaton extends its supercapacitor module offering with increased voltage for rugged environments," Press Release, Eaton Corporation, https://www.eaton.com/us/en-us/company/news-insights/news-releases/2019/xir-supercapacitor-module-august-2019.html.
Moore-Coyler, Roland, "What is a supercapacitor? The next step for EVs and hybrids explained," Car News, Sep. 3, 2019, https://www.carmagazine.co.uk/car-news/tech/what-is-supercapacitor-battery-ev-and-hybrid/, accessed May 19, 2021 (9 pages).
McFadden, Christopher, "Could Ultracapacitors Replace Batteries in Future Electric Vehicles?," https://interestingengineering.com/could-ultracapacitors-replace-batteries-in-future-electric-vehicle s, published Jun. 6, 2020, accessed May 19, 2021 (18 pages).
Sturgess, Steve, "An end to dead vehicle batteries?", https://www.fleetmaintenance.com/equipment/battery-and-electrical/article/12212717/an-end-to-dead-vehicle-batteries, dated Jul. 11. 2016, accessed May 19, 2021 (13 pages).

\* cited by examiner

ENERGY RECOVERY USING SUPERCAPACITORS

TECHNICAL FIELD

Aspects of this disclosure generally relate to systems, processes, and devices utilized for energy recovery, storage, and distribution. This disclosure includes systems and processes that can be used to increase the efficiency of energy recovery for vehicles and related applications.

BACKGROUND

Energy recovery during, among others, braking and downhill motion events in vehicles may result in significant economic and environmental benefits. Because of the slow energy absorption of batteries, batteries are limited in the quantity of energy they may be able to store from these events. Supercapacitors are high-capacity capacitors with capacitance values significantly higher than those of electrolytic capacitors. While supercapacitors may be suitable for quickly storing high amounts of energy, their use in hybrid vehicles has been limited. Due to capacitors' linear relationship between their state of charge and output voltage, capacitors are limited to providing power to high voltage motor systems where the capacitors' stored voltage level exceeds the input voltage of the motor system. Any energy stored in the capacitors below the input voltage of the motor system was unusable. No device exists that addresses these shortcomings and improves the energy efficiency of energy recovery systems and processes.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one or more aspects, this disclosure includes an electrical energy storage and distribution system for a vehicle, which includes a first switch and a high-voltage circuit. The high-voltage circuit may further include an electric motor system that may be configured to convert electrical energy into kinetic energy during a drive mode, and to convert kinetic energy into electrical energy during a generator mode. The high-voltage circuit may also include an electrical energy supply device connected to the electric motor system and configured to supply electrical energy to the electric motor system during the drive mode. The high-voltage circuit may also include a supercapacitor device connected to the electric motor system through the first switch. The system may also include a medium-voltage circuit that has a power distribution device connected to a battery. A bidirectional DC-to-DC converter may be configured to connect the power distribution device and the electric motor system. A second switch and a first unidirectional DC-to-DC converter may be configured to allow current to flow, via the second switch, from the capacitor device to the power distribution device. The system may also include a second unidirectional DC-to-DC converter and a low-voltage circuit that are connected, via the second unidirectional DC-to-DC converter, to the medium-voltage circuit. The system may include a third switch, such that the second unidirectional DC-to-DC converter may be configured to allow current to flow from the high-voltage circuit to the low-voltage circuit, and such that the low-voltage circuit may be connected, via the second unidirectional DC-to-DC converter and via the third switch, to the capacitor device of the high-voltage circuit.

As used herein, the term "supercapacitor" is understood to refer to a high-capacity capacitor with a capacitance value significantly higher than those of electrolytic capacitors, resulting in a greater storage of energy per unit volume. The supercapacitor device may comprise a single supercapacitor and/or one or more arrays of supercapacitors that, when combined, provide a high power, compact, energy storage system.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

DETAILED DESCRIPTION

Figure 1A:
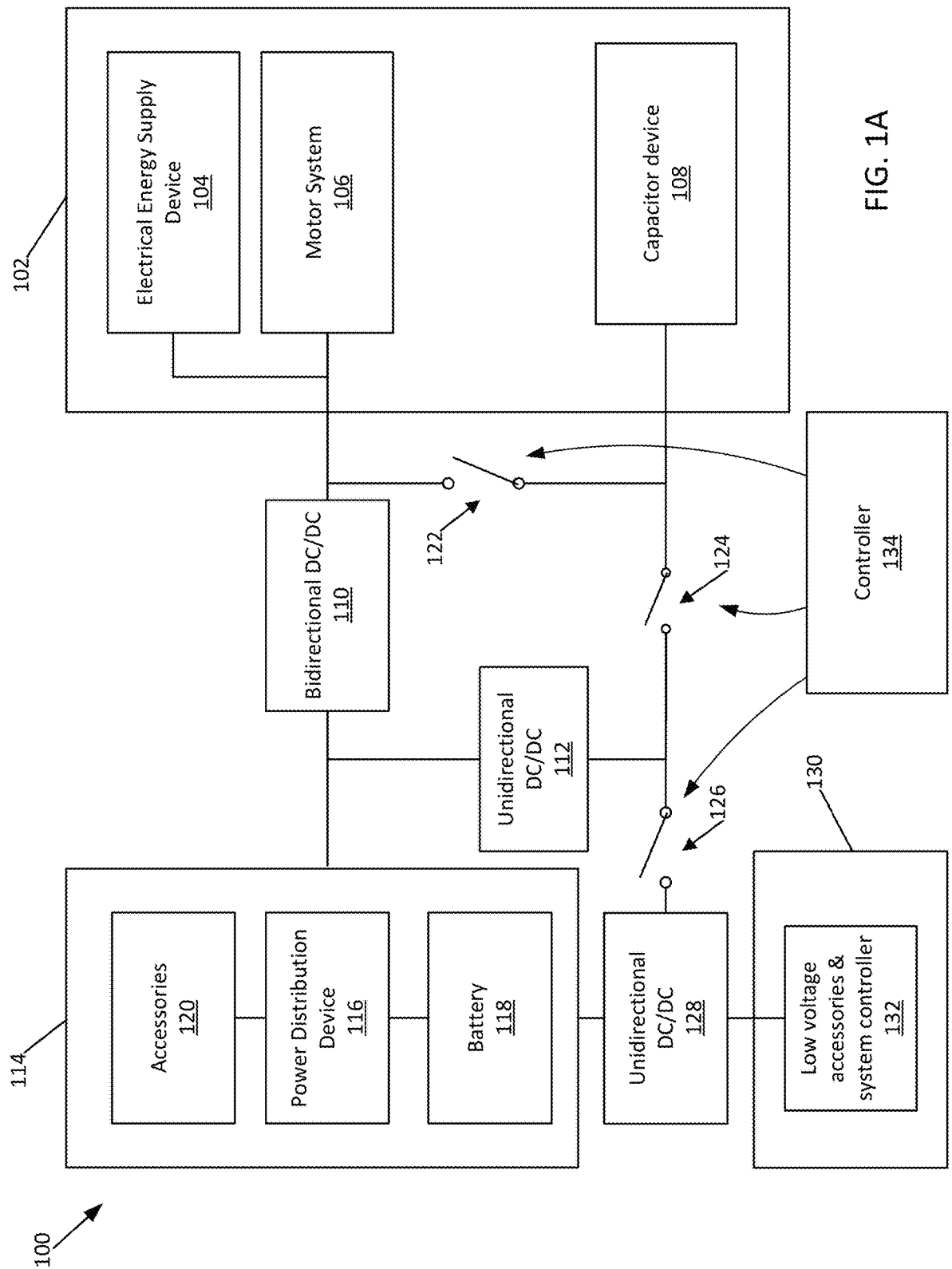
FIGS. 1A-1D schematically depict an electrical energy storage and distribution system, according to one or more aspects described herein.

One or more aspects of the disclosure relate to incorporating one or more high capacitance energy storage systems into hybrid power environments. In one or more examples, the high capacitance energy storage systems may comprise one or more capacitors and/or supercapacitors that are configured to store generated power that would otherwise not be captured to the same extent. Hybrid power environments may comprise hybrid gasoline-electric vehicles in which a gasoline engine is used to charge a battery that power one or more electric motors that drive the vehicle's wheels. The motors may drive the wheels directly and/or may drive the wheels indirectly (e.g., via a transmission and/or differential). Hybrid power environments are not limited to gasoline-electric power systems but may further include diesel-electric power systems, fuel cell-electric power systems, and/or other non-electric fuel sources coupled with electric motors. Further, the hybrid power environments may also comprise non-vehicle automotive environments including trains, cranes, watercraft, and the like.

In hybrid power environments, a rechargeable battery may be used to store energy from an energy source exceeding what is currently required by the electric motor. In other words, potential energy is converted from one state (e.g., gasoline) into another (e.g., electricity) via the energy source and then used to power the electric motor. The electric motor may, in some situations, be an energy source where the system is attempting to convert kinetic energy to potential energy—e.g., during braking, coasting downhill, lowering loads, and the like. For purposes of explanation, this energy recovery process may be referred to as "regenerative braking", but is not limited to vehicular systems but is intended to refer generally to recovering kinetic energy that would otherwise be lost—e.g., as heat. While hybrid systems often include batteries to store energy used to power electric motors, those batteries are normally small as they have been designed to work in conjunction with the primary power source. While some energy may be recovered during regenerative braking in hybrid vehicle systems, most energy is lost as the batteries cannot absorb the large influx of power from the electric motor in a short period.

Further, capacitors in hybrid vehicle systems are disfavored as, while they can store power recovered during regenerative braking, the electric motors are generally unable to use power from the capacitors below the required input voltage of the electric motor. In short, while supercapacitors may recover more energy than batteries in hybrid systems, energy recovered that does not charge the supercapacitors above the input voltage requirements of the electric motors is again wasted. One or more aspects of the disclosure pertain to improving the integration of supercapacitors into hybrid vehicle systems to improve the energy recovered during regenerative braking.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless otherwise specified, may be direct or indirect, wired or wireless, and that the specification is not intended to be limiting in this respect. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising", and variations thereof, is meant to encompass the items listed thereafter and equivalents thereof as well as additional items and equivalents thereof. In the entire specification, when an element is referred to as "comprising" or "including" another element, the element should not be understood as excluding other elements so long as there is no special conflicting description, the element may exist by itself, and/or the element may include at least one other element. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In addition, the terms "unit" and "module", for example, may refer to a component that exerts at least one function or operation, and may be realized in hardware or software, or may be realized by combination of hardware and software. In addition, terms such as " . . . unit", " . . . module" described in the specification mean a unit for performing at least one function or operation, which may be implemented as hardware or software, or as a combination of hardware and software. Throughout the specification, expression 'at least one of a, b, and c' may include 'a only', 'b only', 'c only', 'a and b', 'a and c', 'b and c', and/or 'all of a, b, and c'. Similarly, the specification, expression 'one or more of a, b, and c' may include 'a only', 'b only', 'c only', 'a and b', 'a and c', 'b and c', and/or 'all of a, b, and c'.

FIGS. 1A-1D schematically depict an electrical energy storage and distribution system 100, according to one or more aspects described herein. Those of ordinary skill in the art will recognize that the system 100 may be utilized in a variety of different application settings in which energy is to be stored quickly and re-distributed efficiently. In certain specific examples, the system 100 may be utilized in a vehicle, such as an automobile, van, bus, truck, train, boat, plane, and/or helicopter, among others. In other examples, the system 100 may be utilized in an industrial setting to store energy generated by an industrial process, among others (e.g., including but not limited to fork lifts, gantry cranes, and the like).

FIGS. 1A-1D schematically depict the system 100 in different operational modes that are described in the proceeding sections of this disclosure. The various elements of system 100 are schematically depicted as being electrically connected to one another. It is contemplated that additional current monitoring and voltage conditioning/protection devices or features may be utilized beyond those depicted elements, as will be readily understood to those of ordinary skill in the art. Further, the depicted elements may be implemented as a single consolidated hardware structure, or may be formed from multiple different hardware elements that are connected to one another using appropriate electrical connections and communication hardware that ensure appropriate electrical insulation and isolation, where applicable.

FIG. 1A depicts the system 100 as having a high-voltage circuit 102. This high-voltage circuit 102 further includes an electrical energy supply device 104 connected to a motor system 106. Motor system 106 may otherwise be referred to as a high voltage electrical motor 106. In certain examples, the electrical energy supply device 104 may be a fuel cell that converts chemical energy into electrical energy. Such a fuel cell may also include one or more batteries configured to store generated electrical energy in order to buffer/stabilize voltage at the output of the fuel cell. In general, those of ordinary skill in the art will recognize that any electrical energy supply device 104 may utilize one or more batteries configured to temporarily or otherwise store generated electrical energy prior to distribution to the motor system 106 in order to facilitate smooth voltage and/or current output at the electrical energy supply device 104, in addition to offering longer-term electrical energy storage. In another example, the electrical energy supply device 104 may include a combustion engine (internal and/or external combustion engine) connected to an electrical generator such that the combustion engine may convert chemical energy into kinetic energy which is used to drive the electrical generator to further convert the kinetic energy into electrical energy at the output of the electrical energy supply device 104. The electrical energy supply device 104, when implemented as a combustion engine, may, additionally or alternatively, store generated electrical energy in a battery 118 and/or within one or more batteries within the electrical energy supply device 104. It is contemplated that the electrical energy supply device 104, when implemented with a combustion engine, may utilize any form of fossil fuel or biofuel. In another example, the electrical energy supply device 104 may utilize a combustion engine such that the output of the device 104 is kinetic energy that drives the motor system 106. In another example, the electrical energy supply device 104 may include one or more photovoltaic panels. In yet other examples, the electrical energy supply device 104 may include a combination of two or more of the devices described previously.

The motor system 106 may be configured to convert electrical energy into kinetic energy to drive a vehicle and/or to perform useful work of another kind using kinetic energy outputted form the motor system 106. In one example, the motor system 106 may include an AC motor and a motor inverter. In another example, the motor system 106 may include a DC motor and a DC motor voltage control device. Those of ordinary skill in the art will recognize additional motor controller elements that may be utilized with the motor system 106, without departing from the scope of these disclosures. Further, the motor system 106 may utilize multiple motors of a same or different variety, without departing from the scope of these disclosures. Accordingly, the motor system 106 may utilize one or more AC or DC motors of any power rating, and with appropriate voltage and speed control elements, without departing from the scope of these disclosures.

In another example, the motor system 106 may be configured to receive kinetic energy from device 104 and change the speed of the input into a useful speed for locomotion at the output of the motor system 106 using one or more gearing mechanisms (e.g., a gearbox). Those of ordinary skill in the art will recognize various implementations of gearing systems that may be utilized, without departing from the scope of these disclosures.

The motor system 106 may additionally be configured to convert electrical energy into kinetic energy to, among others, drive a vehicle (e.g., drive a wheel, a drive shaft, a propeller, an impeller, among others) and to convert kinetic energy into electrical energy. In one example, the motor system 106 may be configured to convert electrical energy into kinetic energy during a drive mode and to convert kinetic energy into electrical energy during a generator mode. The voltages at which the motor system 106 operates in the drive mode and generator mode may have any values. In one example, the motor system 106 may be configured to operate at a nominal voltage of 700 V, or to operate within a range of 600-800 V, or 500-900 V, among others.

The high-voltage circuit 102 may additionally include a capacitor device 108 connected to the electric motor system 106 via a first switch 122. The capacitor device 108 may otherwise be referred to as a capacitive storage system 108. Those of ordinary skill in the art will recognize different switch types that may be utilized in scenarios that utilize different voltage and current strengths. The first switch 122 may be referred to as a contactor 122, or a relay 122, among others. Specifically, the capacitor device 108 may be a supercapacitor 108. In one example, the supercapacitor device 108 may have a capacitance of at least 1 Farad, 10 Farads, 100 Farads, 1000 Farads, or 10000 Farads, among others. Further, the supercapacitor device 108 may utilize any suitable supercapacitor technology, including double-layer capacitor structures, or pseudo-capacitors, among others. Advantageously, the supercapacitor device 108 may be configured to store a large amount of electrical energy over a short period of time such that the supercapacitor device 108 may have a higher power density than other energy storage elements within the system 100 (e.g., higher than battery 118 or one or more batteries of the electrical energy supply device 104). In certain examples, the supercapacitor device 108 may have a power rating of at least 500 W, 1 kW, 2 kW, 3 kW, or 5 kW, among others. For example, for a heavy duty truck, a 100 Farad supercapacitor may be used with a power rating of more than 500 kW. The power rating may scale with the thickness of cables connecting various components. Further advantageously, the system 100 may allow for more efficient use of the supercapacitor device 108 by allowing a high amount of the stored charge in the supercapacitor device 108 to be used as electrical energy throughout the system 100. The output voltage from a capacitor device, such as supercapacitor device 108, may vary approximately linearly with stored charge. Consequently, if a capacitor device is used to distribute electrical energy to a motor, such as motor system 106, the capacitor device may only maintain its output voltage at a level that is high enough to be useful for driving the motor over a comparatively small range of a total voltage range of the stored charge in the capacitor. System 100 offers an improvement by allowing energy stored within the capacitor device 108 to be routed to different portions of the system 100, depending upon the state of charge of the capacitor device 108. These different operational modes are described in the proceeding sections of the disclosure.

In one example, the high-voltage circuit 102 may be configured to operate at a nominal voltage of 700 V. In certain examples, the high-voltage circuit 102 may be configured to operate at voltages in the range of 600-800 V or 500-900 V, among others. It will be understood that while the capacitor device 108 is, in one implementation, within the high-voltage circuit 102, the capacitor device 108 may be configured to output voltages ranging from 0 V up to the highest voltage generated by the motor system 106. This highest voltage may be 800 V, 900 V, or 1000 V, among others. Accordingly, the capacitor device 108 may output voltages that are below the voltages at which the high-voltage circuit is configured to operate. In such instances, the current from the capacitor device 108 may be directed to a medium-voltage circuit 114 or low-voltage circuit 130, as described in the proceeding disclosures. The medium-voltage circuit 114 may otherwise be referred to as a medium voltage system 114, and the low-voltage circuit 130 may otherwise be referred to as a low voltage system 130.

The system 100 may additionally include a bidirectional DC-to-DC converter 110 configured to connect the high-voltage circuit 102 to a medium-voltage circuit 114. In one example, the bidirectional DC-to-DC converter 110 may electrically connect the motor system 106 to a power distribution device 116. Further, the capacitor device 108 may be connected to the bidirectional DC-to-DC converter 110 through the switch 122. In one example, the bidirectional DC-to-DC converter 110 may be configured to step down the voltage as current passes from the high-voltage circuit 102 to the medium-voltage circuit 114, and to step up the voltage as current passes from the medium-voltage circuit 114 to the high-voltage circuit 102. Those of ordinary skill in the art will recognize various voltage converter technologies that may be utilized in the bidirectional DC-to-DC converter 110, without departing from the scope of these disclosures. The system 100 may additionally include a second switch 124 that connects the capacitor device 108 through to a unidirectional DC-to-DC converter 112. The second switch 124 may be similar to the first switch 122. In one example, the second switch 124 may be rated with a maximum voltage and/or current that may be handled by the switch 124. Further, the switch 124 may alternatively be referred to as a connector 124 and/or relay 124. The unidirectional DC-to-DC converter 112 may be configured to allow current to flow in one direction from the capacitor device 108 through to the medium-voltage circuit 114. Further, the unidirectional DC-to-DC converter 112 may be configured to step down the voltage as current passes from the capacitor device 108 through to the medium-voltage circuit 114. Those of ordinary skill in the art will recognize different voltage conversion technologies that may be utilized in the converter 112, without departing from the scope of these disclosures. Further, the converter 112 may be configured to convert different high-voltage values to different medium (lower) voltage values, without departing from the scope of these disclosures. In one specific example, the medium-voltage circuit 114 may be configured to operate at a nominal voltage of 350 V. In other examples, the medium-voltage circuit may be configured to operate at voltages of 300 V, 240 V, and/or at voltages ranging from 300-500 V, from 300-600 V, from 250 V-500 V, from 250 V-600 V, from 200 V-500 V, from 200-600 V, from 150 V-500 V, from 150 V-600 V, among others.

The medium-voltage circuit 114 may additionally include a battery 118 and accessories 120. The battery 118 may be formed from multiple series-connected batteries/cells. Accordingly, the battery 118 may utilize any battery technologies and/or chemistries, without departing from the scope of these disclosures. In one example, the battery 118 may be rated at 350 V, and may utilize lithium ion technology (Li-ion). However, the battery 118 may alternatively utilize lead acid chemistry technology, without departing from the scope of these disclosures. Accessories 120 may include medium-voltage systems of a vehicle, such as air conditioning, braking control systems, stability control systems, hydraulic and pneumatic systems, among others. However, these systems may be located in one or more of the high-voltage circuit 102 on the low-voltage circuit 130. The power distribution device 116 may include the hardware, firmware, and/or software configured to distribute electrical energy to various systems of, e.g., a vehicle. Various power distribution device technologies may be utilized with the system 100, without departing from the scope of these disclosures.

A third switch 126 may connect the second switch 124 and the capacitor device 108 to a second unidirectional DC-to-DC converter 128 and a low-voltage circuit 130. Accordingly, the switch 126 may be similar to switches 122 and 124. In one example, the switch 126 may be configured to operate at lower voltage and/or current levels. The second unidirectional DC-to-DC converter 128 may be configured to allow current to pass from the switch 126 or the medium-voltage circuit 114 through to the low-voltage circuit 130. In one example, the low-voltage circuit may include low-voltage accessories and a system controller 132. These low-voltage accessories may include vehicle lighting systems, indicator lights, stereo and navigation systems, camera systems, among many others. However, one or more of the systems may be positioned within the high-voltage circuit 102 and/or the medium-voltage circuit 114. In one example, the low-voltage circuit 130 may operate at 12 V or 24 V, such that the unidirectional DC-to-DC converter 128 may be configured to step down a voltage to 12 V or 24 V. Alternative voltage levels may be utilized within the low-voltage circuit 130, without departing from the scope of these disclosures.

In one example, the system controller of element 132 may include one or more processors configured to control one or more of the elements of system 100. It is contemplated that one or more of the elements of the system 100 may be controlled by digital or analog electrical signals. The system controller of element 132 may contain the hardware firmware and/or software configured to control the elements of system 100 within different operational modes, as described in the processing disclosures. Further, the control signals from system controller 132 to other elements of the system 100 may be via low voltage or wireless connections that are not depicted in FIGS. 1A-1D.

The system 100 may be configured to be set into one or more operational modes in order to store or distribute stored electrical energy. FIG. 1A schematically depicts a disconnected operational mode, whereby the first switch 122 is set in an open configuration, the second switch 124 is set in an open configuration, and the third switch 126 is set in an open configuration. In this depicted disconnected operational mode, the supercapacitor 108 is disconnected from the motor system 106, the medium-voltage circuit 114, and the low-voltage circuit 130. Accordingly, when set in the disconnected operational mode of FIG. 1A, the supercapacitor device 108 is not distributing any electrical energy to any other part of the system 100. The system 100 may be set into the depicted disconnected operational mode of FIG. 1A when, e.g., a vehicle is parked in order to retain charge stored in the supercapacitor device 108.

FIG. 1A further includes a controller 134 that controls the states of switches 122, 124, and 126. To simplify other figures, controller 134 is omitted but is considered part of the concepts conveyed by the figures. In one example, functionality of the controller 134 may be executed by element 132.

Figure 1B:
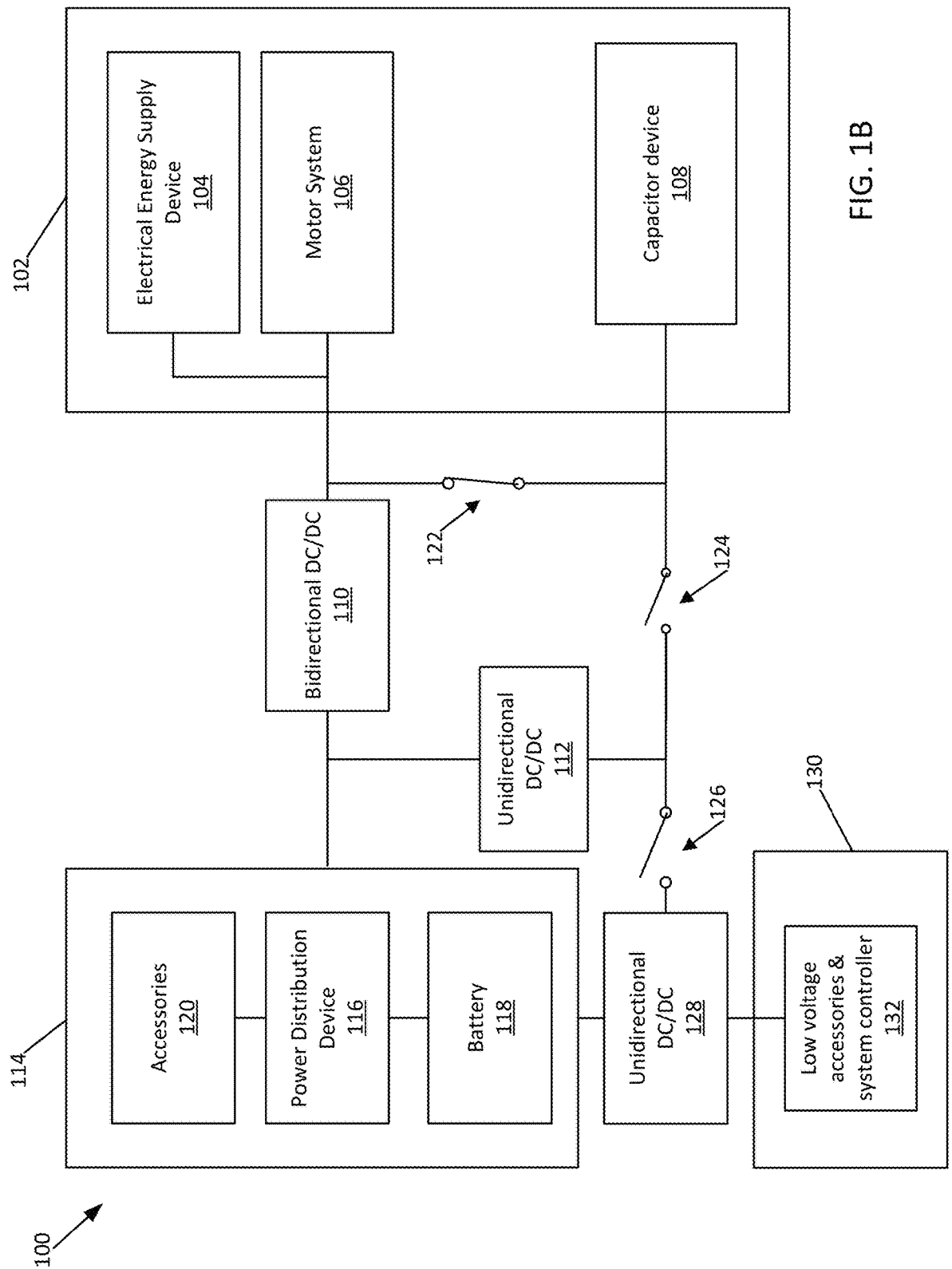

FIG. 1B schematically depicts the electrical energy storage and distribution system 100 when set into an energy recovery operational mode and a high-voltage distribution mode. When in the energy recovery operational mode and the high-voltage distribution mode, the first switch 122 is set in a closed configuration, the second switch 124 is set in an open configuration, and the third switch 126 is set in an open configuration. The energy recovery operational mode may be activated during a scenario when the motor system is generating electrical energy during a generator mode of the motor system 106. Accordingly, when in the energy recovery operational mode, at least a portion of the electrical energy generated by the motor system may be conveyed to and stored by the supercapacitor device 108. The high-voltage distribution mode may correspond to a scenario whereby the motor system 106 is set into a drive mode. Accordingly, during the high-voltage distribution mode of the supercapacitor device 108, electrical energy stored within the supercapacitor device 108 may be used to fully power the motor system 106, or to supplement energy supplied by the electrical energy supply device 104 and/or battery 118. In one specific example, the high-voltage distribution mode of the supercapacitor device 108 may be used during startup scenarios such as when the motor system 106 is accelerating from rest.

In one example, the system 100 may transition from the energy recovery operational mode to the high-voltage distribution mode based upon the output voltages of the motor system and the capacitor device 108. In one example, the system 100 may enter into the energy recovery operational mode when the output voltage of the motor system 106 operating in a generator mode is higher than an output voltage of the capacitor device 108 and/or when it is sensed/detected that the motor system 106 is operating in a generator mode. In certain examples, the output voltage from the motor system 106 may be less than an output voltage of the capacitor device 108, but the motor system 106 may still be operating in a generator mode such that electrical energy from the capacitor device 108 is not needed to drive the motor system 106. In such scenarios, the first switch 122 may be opened to prevent current from flowing from the capacitor device 108 through to the motor system 106. Similarly, the system 100 may be transitioned to the high-voltage distribution mode when the output voltage from the capacitor device 108 is above an input voltage used to drive the motor system 106 when set into a drive mode (this input voltage to the motor system may be nominally 700 V, or may range between 600 and 800 V, among others). However, current from the capacitor device 108 through to the motor system 106 may be controlled by the opening of switch 122 and/or by one or more motor controller devices of the motor system 106.

Figure 1C:
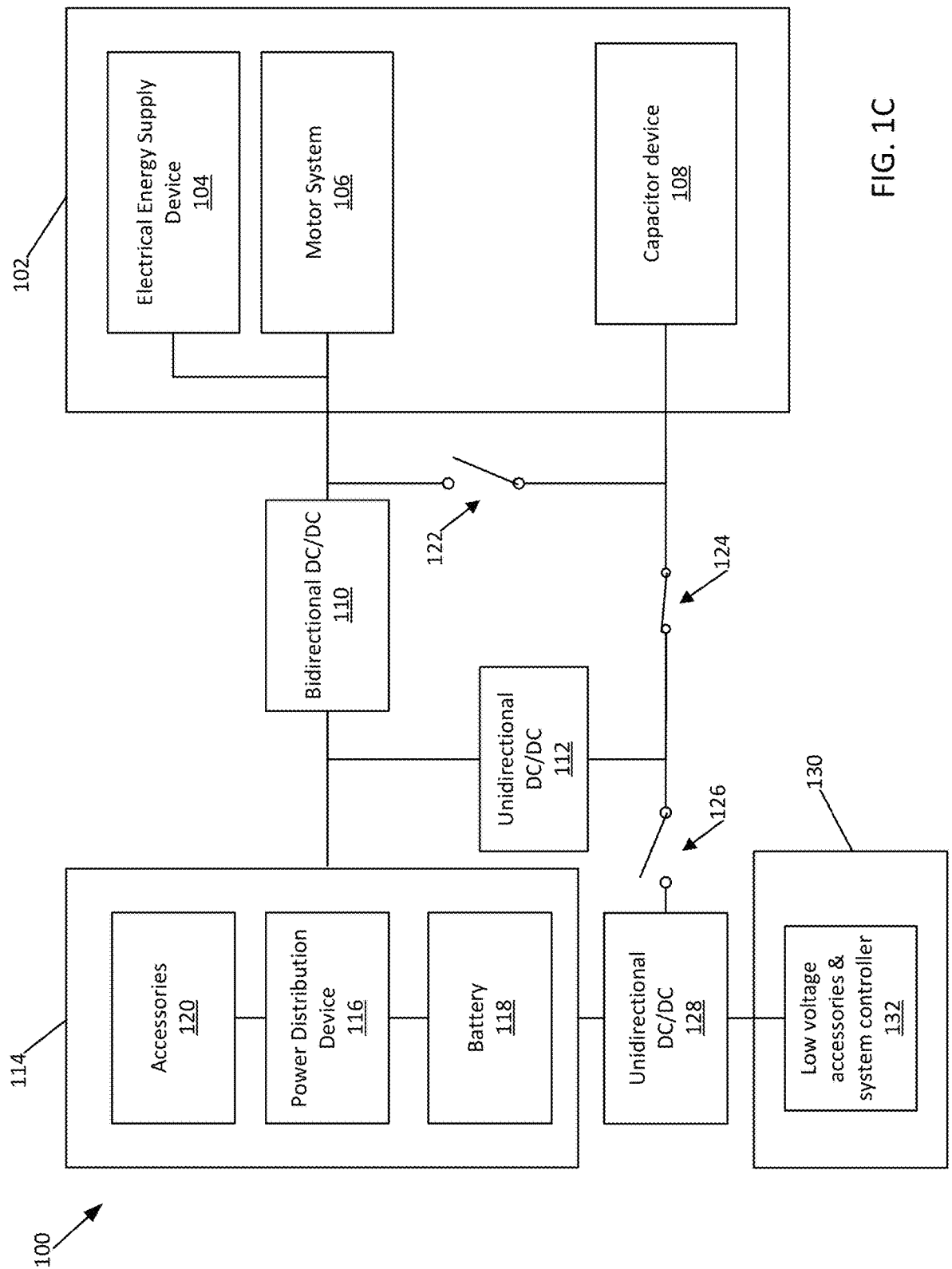

FIG. 1C schematically depicts the system 100 set into a medium-voltage distribution mode, according to one or more aspects described herein. When in the medium-voltage distribution mode, the first switch 122 is set in an open configuration, the second switch 124 is set in a closed configuration, and the third switch 126 is set in an open configuration. The system 100 may transition from the high-voltage distribution mode to the medium-voltage distribution mode when an output voltage of the capacitor device 108 is at or below a high-voltage threshold value. This high-voltage threshold value may, in one example, have a value of 600 V. In other examples, the high-voltage threshold value may be 500 V or 550 V, among others. Indeed, it is contemplated that the high-voltage threshold value may have any value, without departing from the scope of these disclosures. When set into the medium-voltage distribution mode of FIG. 1C, current passes from the supercapacitor device 108 through to the first unidirectional DC-to-DC converter 112, and through to the medium-voltage circuit 114.

Figure 1D:
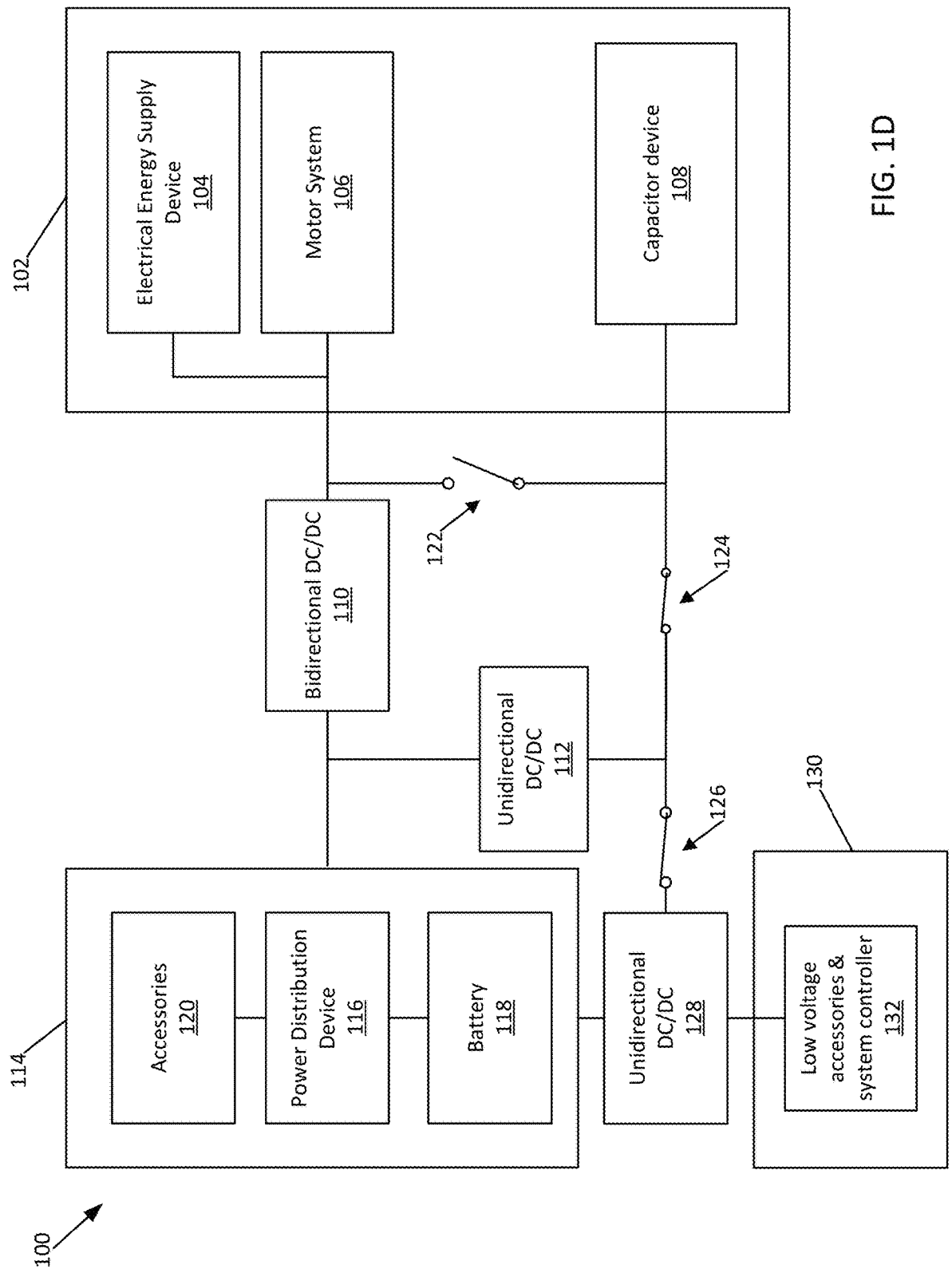

FIG. 1D schematically depicts the system 100 set into a low-voltage distribution mode, according to one or more aspects described herein. When set into the low-voltage distribution mode, the first switch 122 is set in an open configuration, the second switch 124 is set in a closed configuration, and the third switch 126 is set in a closed configuration. The system 100 may transition from the medium-voltage distribution mode to the low-voltage distribution mode when an output voltage from the capacitor device 108 is at or below a medium-voltage threshold value. This medium-voltage threshold value may, in one example, have a value of 250 V. In other examples, the medium-voltage threshold value may be 50 V, 100 V, 150 V, or 300 V, among others. Indeed, it is contemplated that the medium-voltage threshold value may have any value, without departing from the scope of these disclosures. When set into the low-voltage distribution mode of FIG. 1D, current passes from the supercapacitor device 108 through the second switch 124, the third switch 126, and the second unidirectional DC-to-DC converter 128 to the low-voltage circuit 130.

Figure 2:
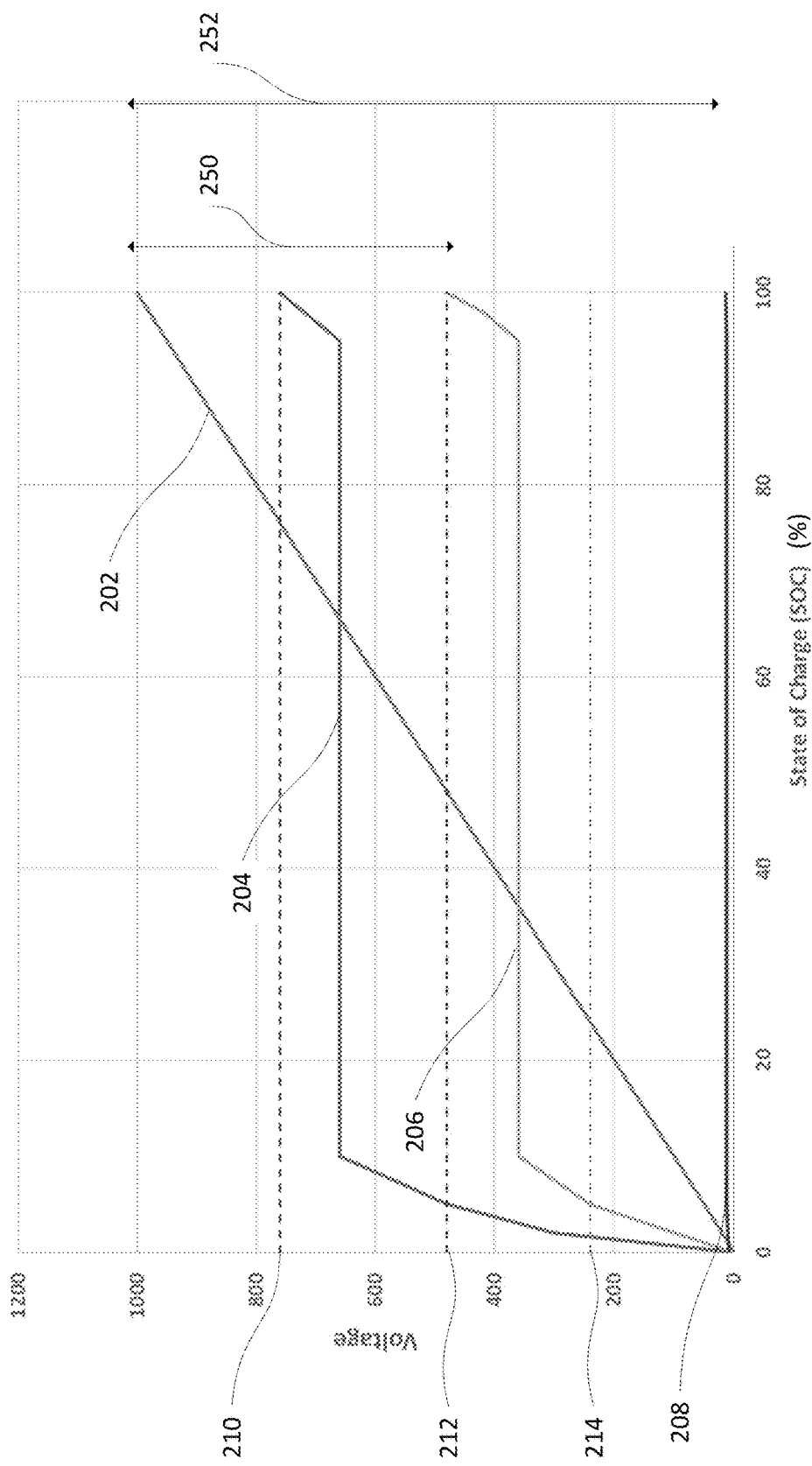
FIG. 2 depicts multiple graphs of voltage versus state of charge for a supercapacitor device and a battery of the system of FIGS. 1A-1D, according to one or more aspects described herein.

FIG. 2 depicts multiple graphs of voltage versus state of charge for the supercapacitor device 108 and a battery 118 of the system 100, according to one or more aspects described herein. It is noted that the graphs of FIG. 2 are schematically depicted, and the values of the axes correspond to one possible implementation of the elements of system 100. Accordingly, the values of the voltages on the y-axis in FIG. 2 may differ, without departing from the scope of these disclosures. In one example, graph 202 corresponds to the supercapacitor device 108, and depicts an approximately linear relationship between output voltage (y-axis) and the state of charge (x-axis) (expressed as a percentage). Graph 206 corresponds to the battery 118, and depicts the relationship between the output voltage from the battery 118 and its state of charge. As schematically depicted by graph 206, the battery 118 has an approximately level/stable/constant voltage output for much of its charge capacity. E.g., graph 206 depicts an output voltage of approximately 350 V when the state of charge of the battery is between approximately 10% and 95%. Graph 204 schematically depicts the output voltage from the battery 118 when stepped up through the bidirectional DC-to-DC converter 110 into the high-voltage circuit 102. The bidirectional DC-to-DC converter 110 may otherwise be referred to as a bidirectional direct current (DC)-to-DC converter 110, and may include one or more terminals that are corrected to portions of the described elements of system 100. In one example, graph 204 therefore corresponds to the output voltage from battery 118 as outputted to the high-voltage circuit 102. Graph 204 has a shape similar to graph 206, and depicts an approximately constant voltage at 700 V as the state of charge of the battery varies from approximately 5% to 95%. Graph 208 schematically depicts the output voltage from the battery 108 when stepped down through the second unidirectional DC-to-DC converter 128. In one example, graph 208 corresponds to the output voltage from the battery 118 as outputted to the low-voltage circuit 130. In one example, the output voltage of graph 208 may be stable at approximately 12 V or 24 V, among others.

Line 210 of FIG. 2 schematically depicts an upper threshold voltage the battery is capable of delivering when stepped up through the bidirectional DC-to-DC converter 110. This upper threshold battery voltage may be approximately 750

V, among others. As depicted, the output voltage from the capacitor represented by graph 202 may exceed the upper threshold voltage of the battery associated with line 210. In one example, the maximum output voltage from the supercapacitor device 108 may be approximately 1000 V. In one example, line 212 may correspond to a high-voltage threshold at or below which the system 100 transitions from the high-voltage distribution mode to the medium-voltage distribution mode. This high-voltage threshold of line 212 may be at approximately 500 V. Similarly, line 214 may correspond to a medium-voltage threshold at or below which the system 100 transitions from the medium-voltage distribution mode to the low-voltage distribution mode. The medium-voltage threshold of line 214 may be approximately 250 V.

Advantageously, transitioning the system 100 through the energy recovery operational mode, the high-voltage distribution mode, the medium-voltage distribution mode, and the low-voltage distribution mode allows for a greater amount of the energy storage capacity of the supercapacitor device 108 to be utilized, which increases the energy storage efficiency of the supercapacitor device 108 and the system 100. Line 250 schematically depicts a useful output voltage range of the capacitor device 108 when used within the high-voltage circuit 102 alone. Line 252 schematically depicts the useful output voltage range of the capacitor device 108 when used within the high-voltage circuit 102, the medium-voltage circuit 114, and the low-voltage circuit 130, and thereby schematically depicts an increased energy efficiency associated with the system 100. In one example, the top right of graph 202 may be referred to as a full capacitor energy level (at 100% state of charge), and the bottom left of graph 202 may referred to as a depleted capacitor energy level (at 0% state of charge). However, in alternative examples, the full capacitor energy level may be below a 100% state of charge, and/or the depleted capacitor energy level may be above a 0% state of charge. In one example, the system 100 utilizes at least 50%, 60%, 65%, 66%, 70%, 75%, 80%, 85%, 90%, 95%, 97%, or 99% of a total energy storage capacity of the supercapacitor device 108. This total energy storage capacity of the supercapacitor device 108 may be represented by line 252. It is noted that line 252 may, in other examples, extend less than a height corresponding to a 0-100% state of charge of the supercapacitor device 108.

Figure 3:
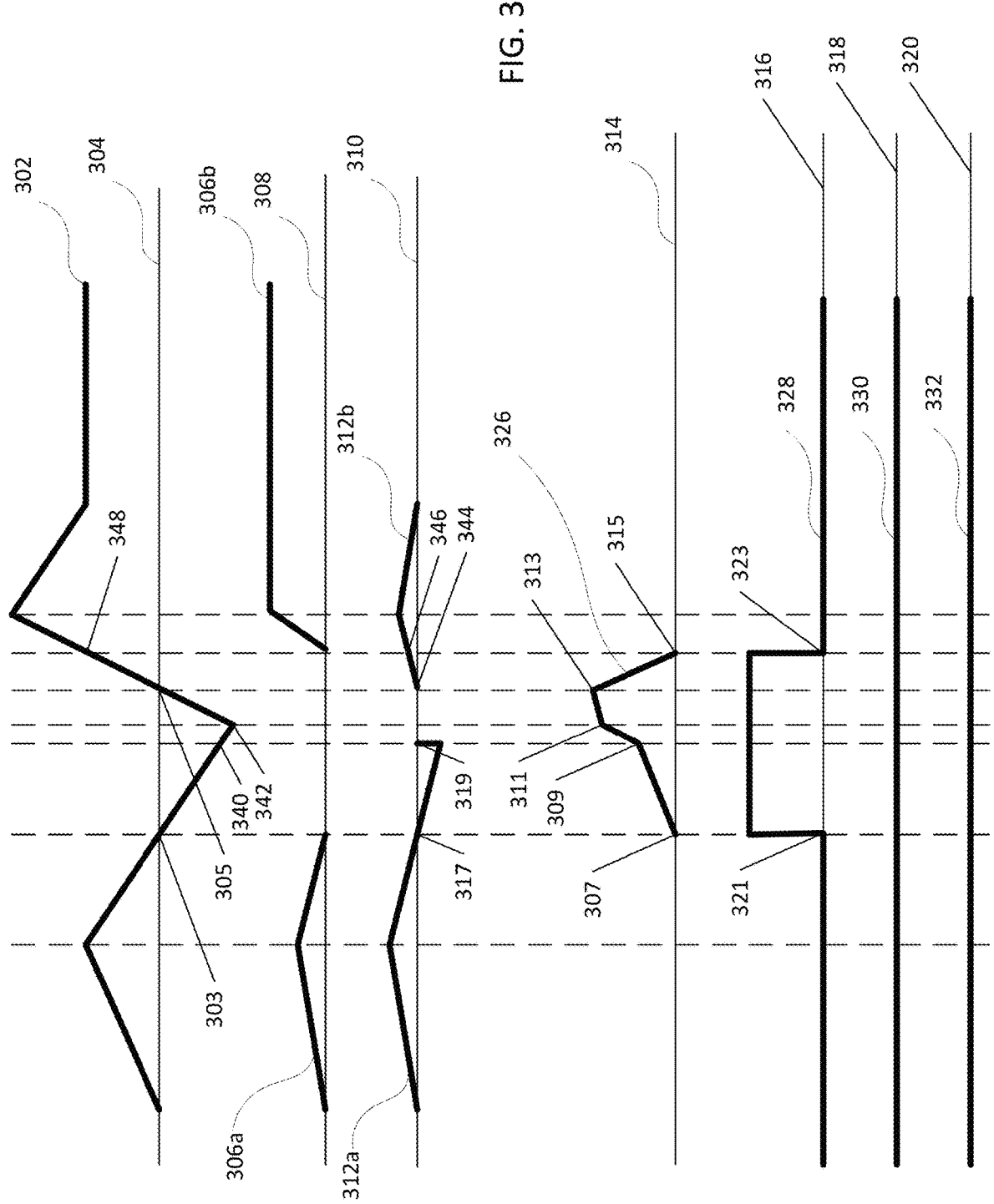
FIG. 3 schematically depicts power output graphs for components of the system of FIGS. 1A-1D during an energy recovery operational mode and a high-voltage distribution mode, according to one or more aspects described herein.

FIG. 3 schematically depicts power output graphs for components of the system 100 during the energy recovery operational mode and high-voltage distribution mode, according to one or more aspects described herein. Graph 302 is a schematic power demand curve for the motor system 106, with line/axis 304 corresponding to 0 W, such that when the graph 302 is above line 304, the motor system 106 requires energy/power, and when graph 302 is below line 304, the motor system 106 is generating energy/power. Graphs 306a and 306b are power supply curves for the electrical energy supply device 104. When the graph 306a or 306b is above the 0 W line 308, the electrical energy supply device 104 is supplying electrical power to the motor system 106. Graphs 312a and 312b are power supply curves for the battery 118. When the graph 312a or 312b is above the 0 W line 310, the battery is supplying electrical energy/power to the motor system 106, and when graph 312a or 312b is below the line 310, the battery is being charged.

Graph 326 schematically depicts a state of charge/output voltage graph for the supercapacitor device 108. Line 314 may correspond to a 0 V output voltage from the supercapacitor device 108, or may be another output voltage level from the capacitor device 108.

Graph 328 schematically depicts a state of the first switch 122, with a high value corresponding to when the first switch 122 is in a closed/on configuration, and a low value corresponding to when the first switch 122 is in an open/off configuration. Similarly, graph 330 schematically depicts a state of the second switch 124, and graph 332 schematically depicts a state of the third switch 126.

The dashed vertical lines of FIG. 3 correspond to the same points in time for each of the graphs. Accordingly, switch 122 is closed between time points 321 and 323. During that same time period, switches 123 and 126 are open (as indicated by graphs 330 and 332 being low during that time period). The time between points 321 and 323 therefore corresponds to a period during which the system 100 is set into the energy recovery operational mode or the high-voltage distribution mode. This period between time points 321 and 323 overlaps with a period during which the motor system 106 is generating energy (graph 302 is below the 0 W line 304 between points 303 and 305). Turning to the supercapacitor graph 326, the supercapacitor 108 is charging between time points 307 and 309. The battery 118 is also charging during this same period, as indicated by the graph 312a being below line 310 between time points 317 and 319. The supercapacitor 108 is charging quickly between time points 309 and 311 (the battery 118 is not charging over the time period between points 309 and 311). This fast charging of the supercapacitor device 108 between time points 309 and 311 corresponds to an increasing power output from the motor system 106 while in the generator mode between time points 340 and 342. Between time points 311 and 313, the supercapacitor device 108 is charging more slowly as the power output from the motor system 106 is in the generator mode between points 342 and 305. Accordingly, the system 100 may be set into the energy recovery operational mode between time points 307 and 313.

The motor power demand curve shown in graph 302 switches from a generator mode to a drive mode at point 305 as the graph transitions from below to above the line 304. Accordingly, the time point 305 (which corresponds to time point 313 on the supercapacitor graph 326) may represent a point at which the system 100 transitions from the energy recovery operational mode to the high-voltage distribution mode. Between time points 313 and 315 of the supercapacitor, graph 326 is distributing stored electrical energy. A portion of this electrical energy outputted from the supercapacitor device 108 may charge the battery 118 (e.g., between time points 344 and 346 of the battery graph 312b). In addition, a portion of the electrical energy outputted from the capacitor device 108 may supply energy to the motor system 106 between time points 305 and 348. This time period between points 305 and 348 may correspond to a startup scenario during which the motor system 106 is accelerating from rest. Accordingly, the supercapacitor device 108 may be configured to provide electrical energy to the motor system 106 during these startup/"from-rest" scenarios. In additional or alternative implementations, the super capacitor device 108 may be configured to provide electrical energy to the motor system 106 during different periods, such as when the motor system is not starting from rest/being stationary.

Figure 4:
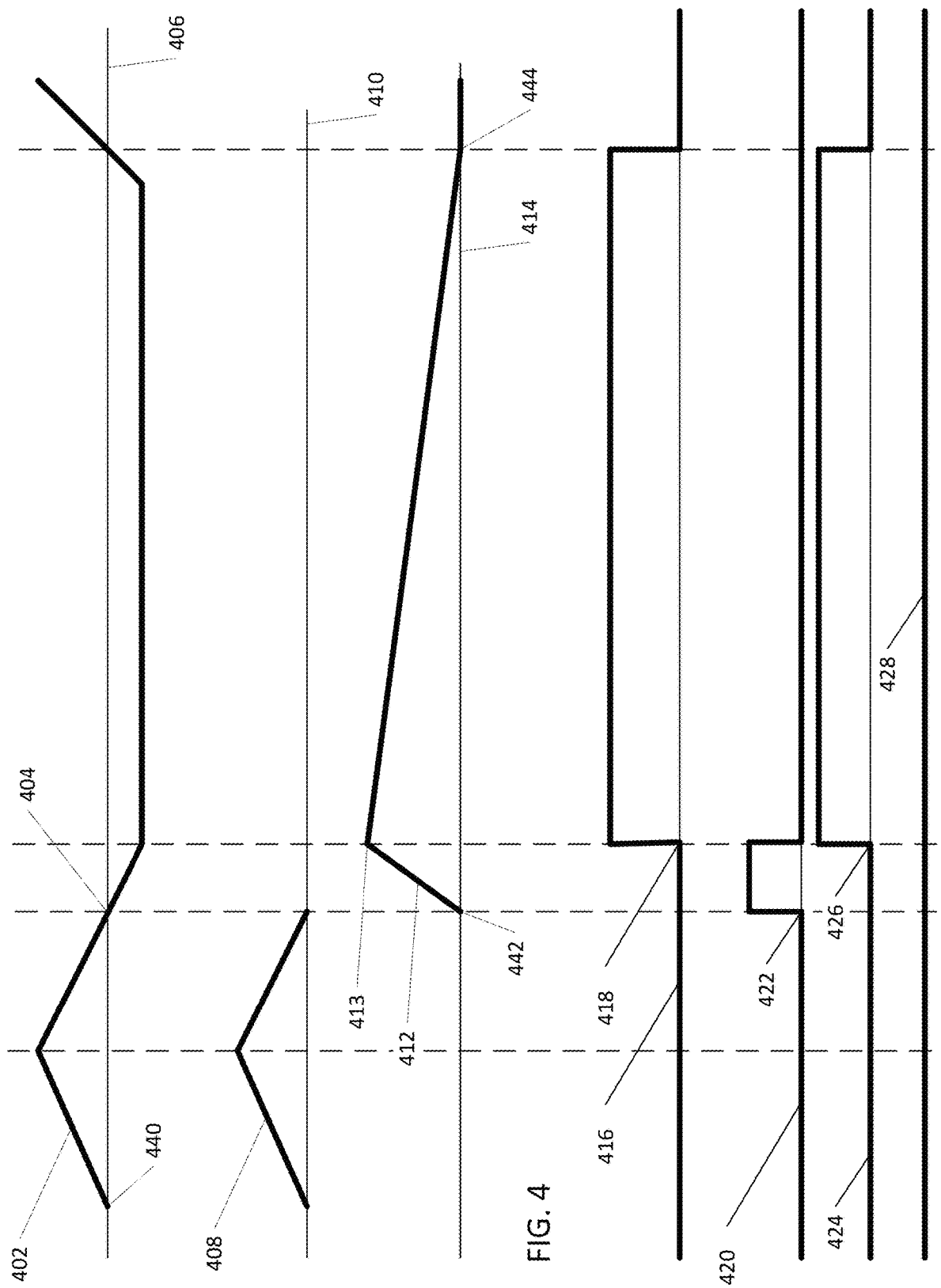
FIG. 4 schematically depicts power output graphs for components of the system of FIGS. 1A-1D as the system transitions from a high-voltage distribution mode to a medium-voltage distribution mode, according to one or more aspects described herein.

FIG. 4 schematically depicts power output graphs for components of the system 100 as the system 100 transitions from a high-voltage distribution mode to a medium-voltage distribution mode, according to one or more aspects described herein. Graph 402 schematically depicts a power demand curve for the motor system 106, with line/axis 406 corresponding to 0 W power demand. Accordingly, when graph 402 is below line 406, the motor system 106 is generating electrical energy in the generator mode, and when graph 402 is above line 406, the motor system 106 is operating in the drive mode, and the motor system 106 demands electrical energy/power from an external source.

Graph 408 schematically depicts a power output graph for the electrical energy supply device 104. When graph 408 is above the 0 W line 410, the electrical energy supply device 104 may be supplying power to the motor system 106. Graph 412 schematically depicts a state of charge/output voltage graph for the supercapacitor device 108. Line 414 may correspond to a 0 V output voltage from the supercapacitor device 108, or may be another output voltage level from the capacitor device 108.

Graph 416 schematically depicts the status of power delivery to the medium-voltage circuit 114 from the supercapacitor device 108. When graph 416 is low, electrical energy is not delivered from the supercapacitor device 108 to the medium-voltage circuit 114. Conversely, when graph 416 is high, the supercapacitor device 108 is delivering electrical energy to the medium-voltage circuit 114 in the medium-voltage distribution mode. Graph 420 schematically depicts a state of the first switch 122, with a high value corresponding to when the first switch 122 is in a closed/on configuration, and a low value corresponding to when the first switch 122 is in an open/off configuration. Similarly, graph 424 schematically depicts a state of the second switch 124, and graph 428 schematically depicts a state of the third switch 126. The dashed vertical lines that extend between the various graphs of FIG. 4 correspond to same points in time.

In one example, the motor system 106 may be operating in a drive mode between time points 440 and 404 and may be supplied with electrical energy by the electrical energy supply device 104, which corresponds to graph 408 being above the line 410. Between time points 442 and 413, the supercapacitor device 108 may be storing electrical energy supplied by the motor system 106 and the system 100 may be operating in the energy recovery operational mode. Accordingly, between time points 442 and 413, switch 122 is closed (graph 420 is high), and switches 124 and 126 are open (graphs 424 and 428 are low).

Point 413 on graph 412 corresponding to the supercapacitor device 108 may be a voltage at which the system 100 transitions from the high-voltage operational mode to the medium-voltage operational mode. At point 413, the first switch 122 may transition from closed to open (graph 420 may transition from high to low), and the second switch 124 may transition from open to closed (graph 424 may transition from low to high). Similarly, at point 413, graph 416 transitions from low to high, which corresponds to power being distributed to the medium-voltage circuit 114 at time point 418. Between time points 413 and 444, the supercapacitor device 108 may be discharged as it supplies electrical energy to the medium-voltage circuit 114.

It is contemplated that various alternative implementations of the system 100 may be utilized, without departing from the scope of these disclosures. Accordingly, the functionality of system 100 described throughout these disclosures is not intended to be limited to the specific implementation schematically depicted in FIGS. 1A-1D. Adjustments to the routing and layout of the various elements may be utilized, without a parting from the scope of these disclosures. FIGS. 5-9 schematically depict alternative systems that may be utilized to provide some or all of the functionality of system 100. In one example, the systems of FIGS. 5-9 may be configured to utilize supercapacitor devices such that the energy storage capacity of the supercapacitor can be used more efficiently than the efficiency of conventional systems that only utilize a small portion of the energy storage capacity of a supercapacitor. Accordingly, FIGS. 5-9 contain one or more elements that are similar to those described in relation to FIGS. 1A-1D. Elements with the same last two digits in their reference numbers may correspond to similar elements. For example, the high-voltage circuit 502 may be similar to high-voltage circuit 102 since the last two digits of the reference numbers are the same.

Figure 5:
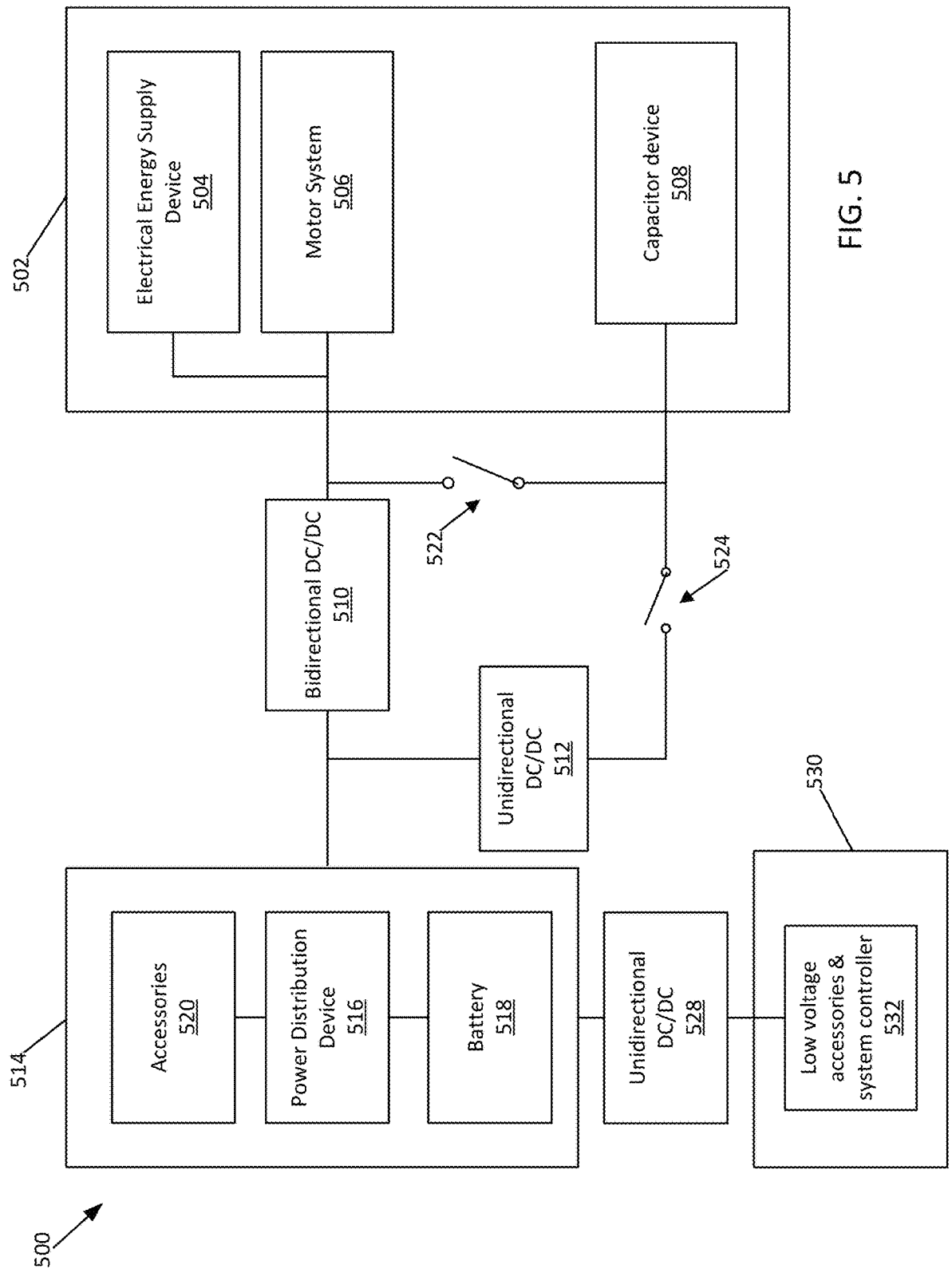
FIG. 5 schematically depicts an electrical energy storage and distribution system, according to one or more aspects described herein.

FIG. 5 schematically depicts an electrical energy storage and distribution system 500, according to one or more aspects described herein. Specifically, the system 500 includes a first switch 522 and a second switch 524. In contrast to system 100, system 500 omits a third switch. Accordingly, the capacitor device 508 may supply electrical energy to the low-voltage circuit 530 by routing current through the first unidirectional DC-to-DC converter 512, the medium-voltage circuit 514, and the second unidirectional DC-to-DC converter 528. A relay within the power distribution device 516 and/or the second unidirectional DC-to-DC converter 528 may control the flow of electrical energy to the low-voltage circuit 530.

Figure 6:
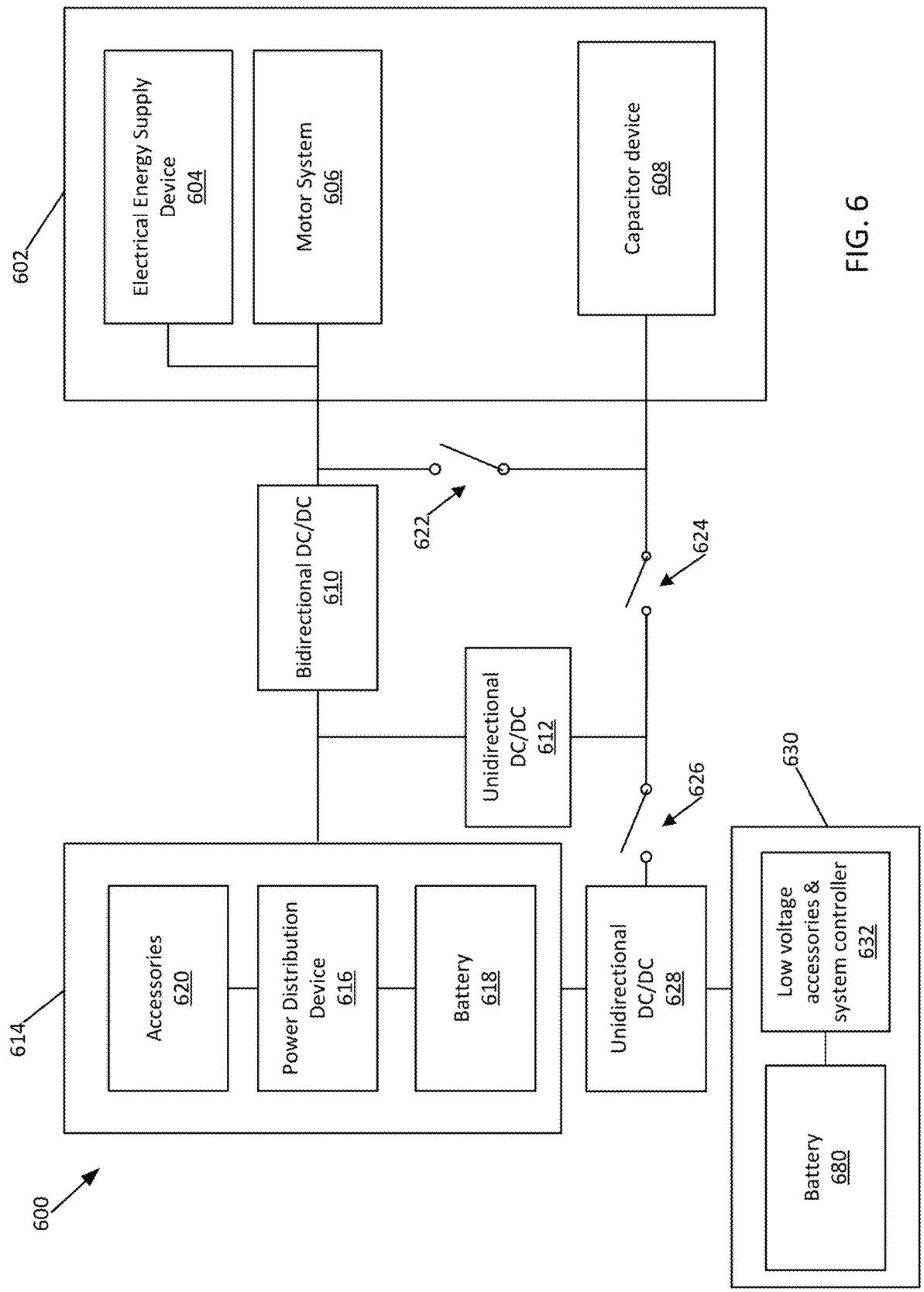
FIG. 6 schematically depicts an electrical energy storage and distribution system, according to one or more aspects described herein.

FIG. 6 schematically depicts an electrical energy storage and distribution system 600, according to one or more aspects described herein. System 600 additionally includes a battery 680. Accordingly, battery 680 may have a nominal output voltage of 12 V or 24 V and may be formed using any applicable battery chemistry and/or hardware elements. In one example, the battery 680 may be configured to provide electrical energy to the low-voltage accessories and system controller 632. In one example, when the system 600 is set into a low-voltage distribution mode, the capacitor device 608 may be configured to deliver electrical energy to the low-voltage circuit 630, which may partially or wholly charge the battery 680 and/or provide electrical energy to the low-voltage accessories and system controller 632.

Figure 7:
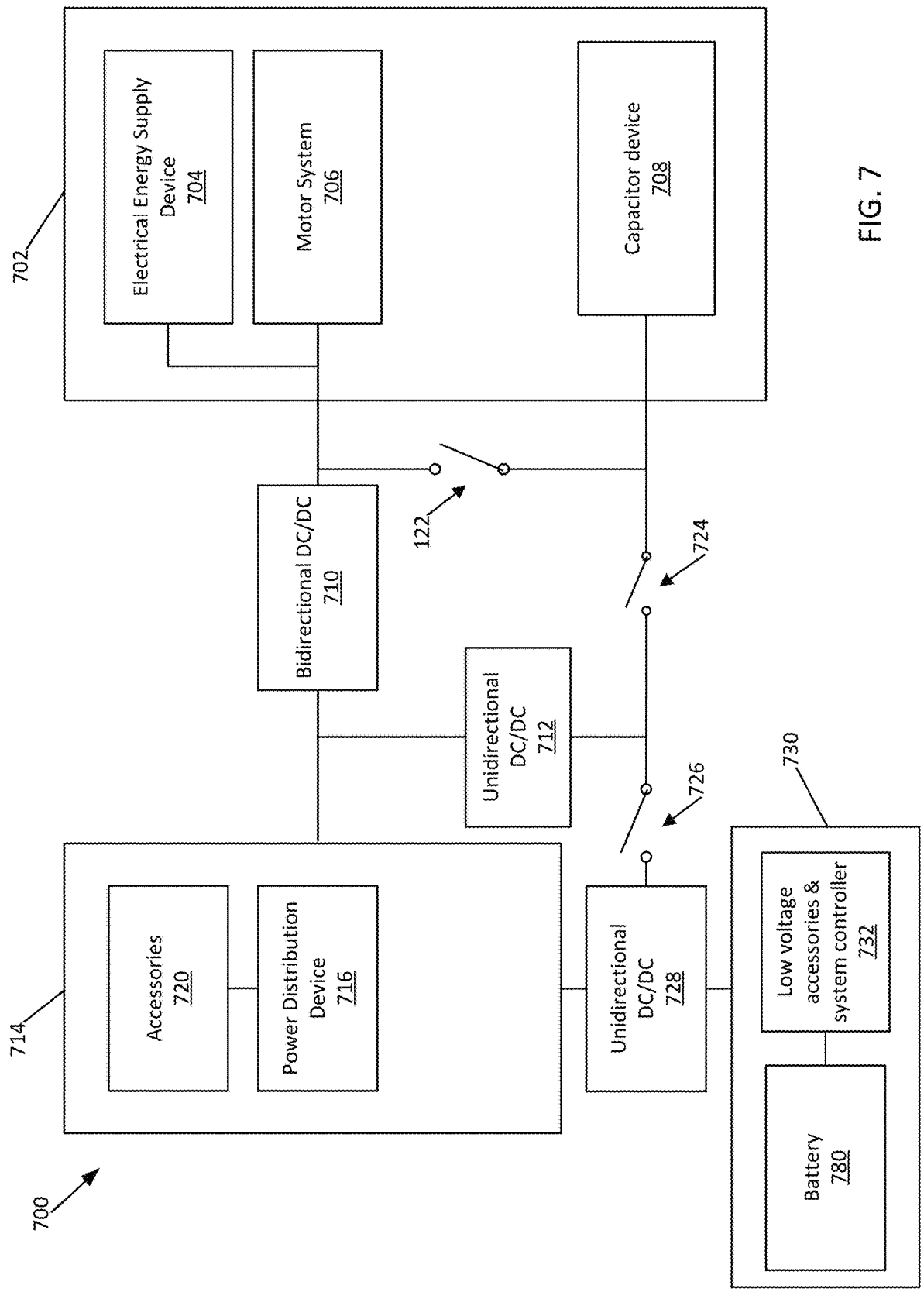
FIG. 7 schematically depicts an electrical energy storage and distribution system, according to one or more aspects described herein.

FIG. 7 schematically depicts an electrical energy storage and distribution system 700, according to one or more aspects described herein. System 700 includes a battery 780, but excludes a battery from the medium-voltage circuit 714. Accordingly, the battery 780 may be configured to power the low-voltage accessories and system controller 732, and may be supplemented by the capacitor device 708 when the system 700 is set into a low-voltage operational mode. Further, the medium-voltage circuit 714 may be powered by the electrical energy supply device 704 which may include one or more batteries, and by the capacitor device 708 when the system 700 is set into a medium-voltage operational mode.

Figure 8:
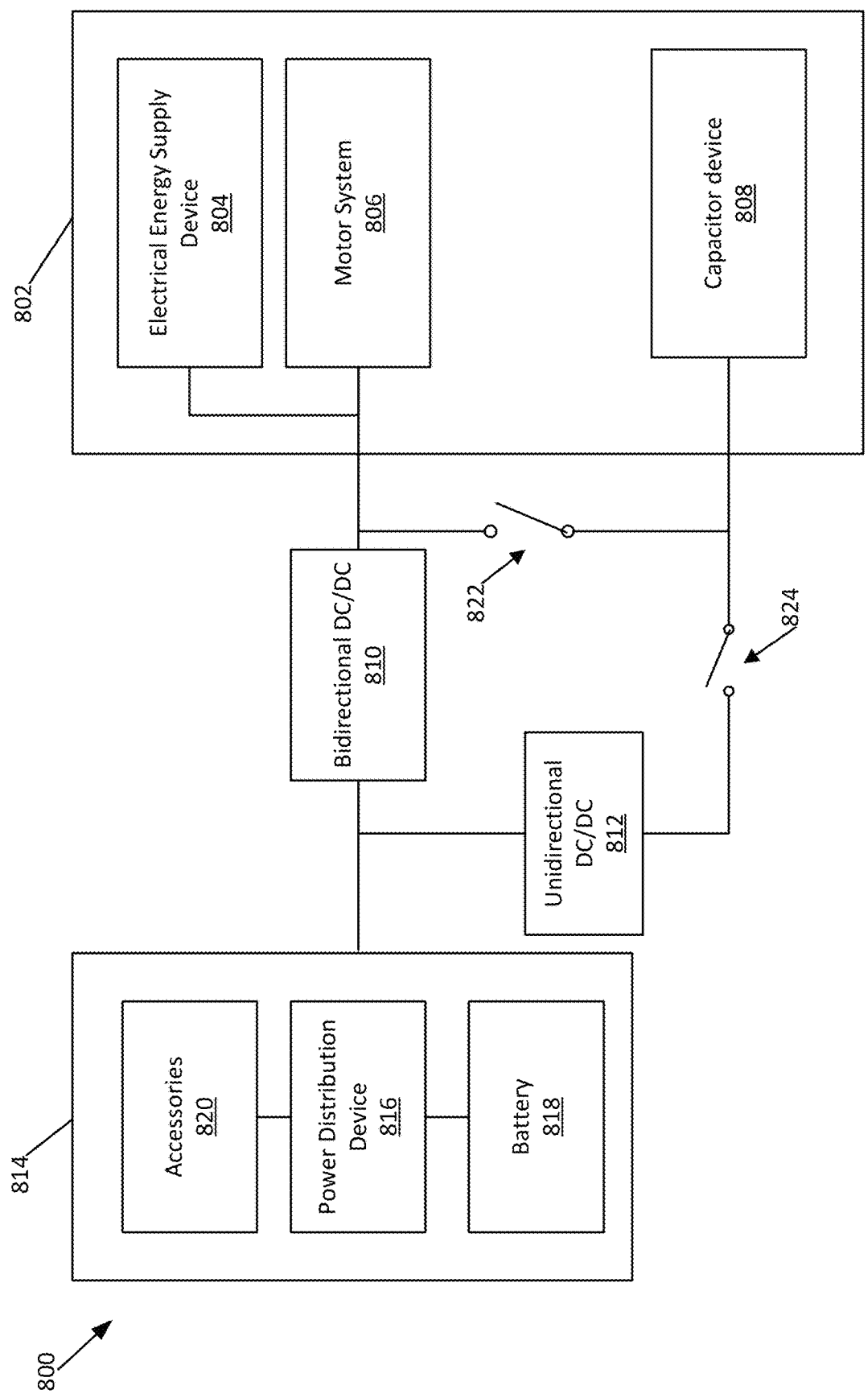
FIG. 8 schematically depicts an electrical energy storage and distribution system, according to one or more aspects described herein.

FIG. 8 schematically depicts an electrical energy storage and distribution system 800, according to one or more aspects described herein. System 800 includes a first voltage circuit 802 and a second voltage circuit 814. The voltages at which the first voltage circuit 802 and the second voltage circuit 814 are configured to operate may have any values, without departing from the scope of these disclosures. In one example, the first voltage circuit 802 may be configured to operate at a higher voltage level than the second voltage circuit 814. The first voltage circuit 802 may be similar to the high-voltage circus 102, and the second voltage circuit 840 may be similar to the medium-voltage circuit 114. System 800 may utilize a first switch 822 and a second switch 824, and may be selectively set into one of multiple operational modes. These multiple operational modes may include a disconnected operational mode, an energy recovery operational mode, a first distribution mode, and a second distribution mode. In one example, the first distribution mode may be similar to the high-voltage distribution mode for the system 100, and the second distribution mode may be similar to the medium-voltage distribution mode for the system 100. The system 800 may transition between the first distribution mode and the second distribution mode at a voltage threshold. It is contemplated that this voltage threshold may have any value. In one example, the voltage threshold may be 600 V, 550 V, 500 V, 450 V, 400 V, 350 V, 300 V, 250 V, 200 V, among others.

Figure 9:
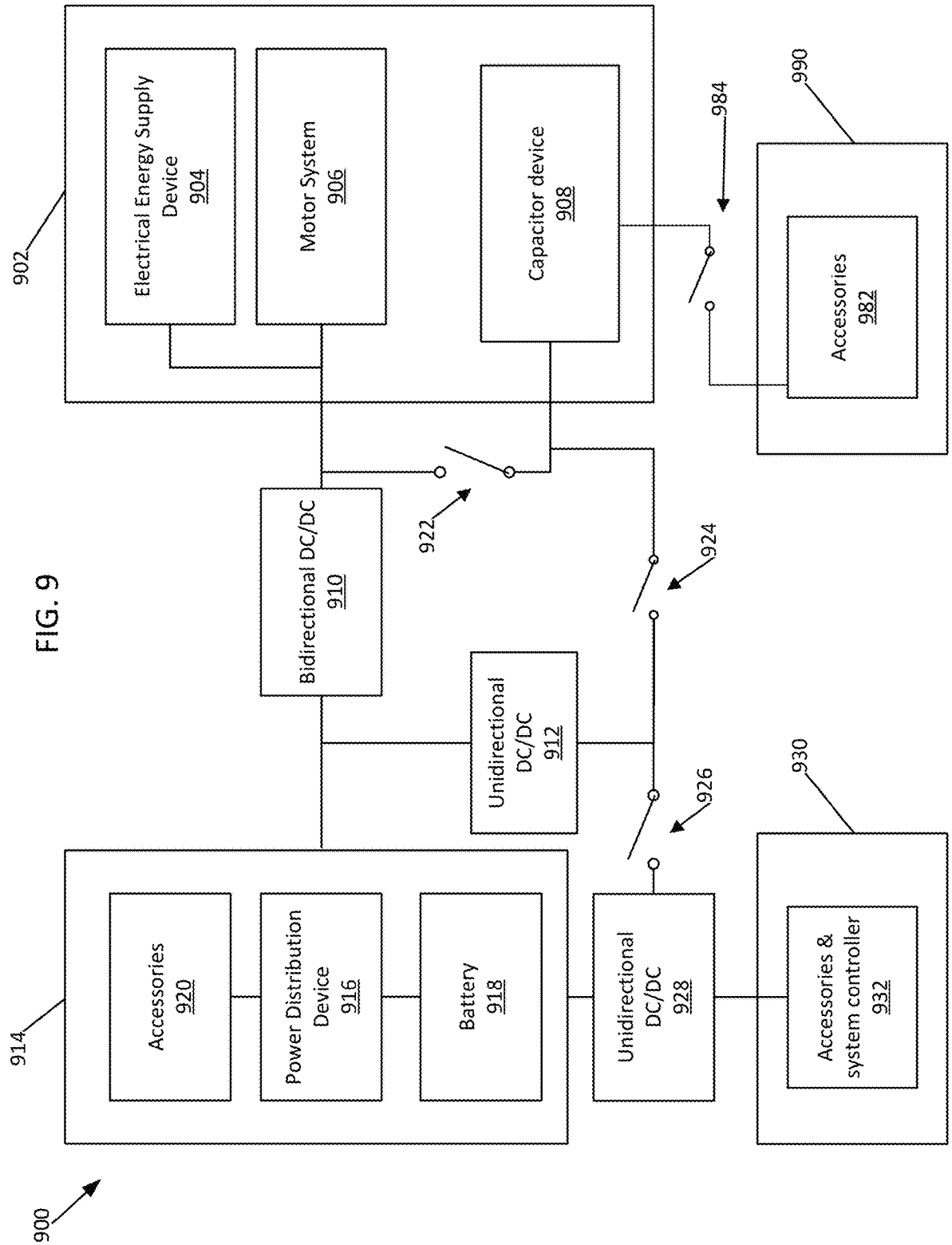
FIG. 9 schematically depicts an electrical energy storage and distribution system, according to one or more aspects described herein.

FIG. 9 schematically depicts an electrical energy storage and distribution system 900, according to one or more aspects described herein. System 900 includes a first voltage circuit 902, a second voltage circuit 914, a third voltage circuit 930, and a fourth voltage circuit 990. Elements of system 900 may be similar to corresponding elements of system 100. However, in addition, system 900 includes the fourth voltage circuit 990. Accordingly, the system 900 may be configured to be set into one of multiple different operational modes. These operational modes may include a disconnected operational mode, and an energy recovery operational mode, which may be similar to those modes for system 100. Additionally, the system 900 may be configured to redirect electrical energy stored in the capacitor device 908 in response to three different voltage threshold levels. The capacitor device 908 may be configured to distribute stored electrical energy to the first voltage circuit 902 when the output voltage from the capacitor device is above a first voltage threshold. This may be referred to as a first distribution mode. Further, the capacitor device 908 may be configured to distribute electrical energy to the second voltage circuit 914 when the output voltage from the capacitor device 908 is between a second voltage threshold and the first voltage threshold, with the second voltage threshold being below the first voltage threshold. This may be referred to as a second distribution mode. Further, the capacitor device 908 may be configured to distribute electrical energy to the third voltage circuit 930 when the output voltage from the capacitor device 908 is between a third voltage threshold and the second voltage threshold, with the third voltage threshold below the second voltage threshold. This may be referred to as a third distribution mode. The capacitor device 908 may be configured to distribute electrical energy to the fourth voltage circuit 990 when the output voltage from the capacitor device 908 is below the third voltage threshold. This may be referred to as a fourth distribution mode.

Switches 922, 924, and 926 may operate in a manner similar to switches 122, 124, and 126. Further, the first distribution mode of the system 900 may be similar to the high-voltage distribution mode of the system 100, the second distribution mode of the system 900 may be similar to the medium-voltage distribution mode of system 100, and the third distribution mode of system 900 may be similar to the low-voltage distribution mode of system 100. System 900 may additionally include a fourth switch 984 selectively set to a closed configuration when the capacitor device and the system 900 is operating in the fourth distribution mode. It is contemplated that the first voltage threshold, the second voltage threshold, and third voltage threshold may have any voltage values, without departing from the scope of these disclosures. When selectively set into the fourth distribution mode, switches 922, 924, and 926 may be in an open configuration, and switch 984 may be in a closed configuration such that current flows from the capacitor device 908 to the accessories 982 in the fourth voltage circuit 990. These accessories 982 may include low-voltage devices that are configured to operate for prolonged periods of time without the electrical energy supply device 904 being active, among others. In one example, the accessories 982 may include an alarm system, or a keyless entry monitoring system for a vehicle, among others.

Figure 10:
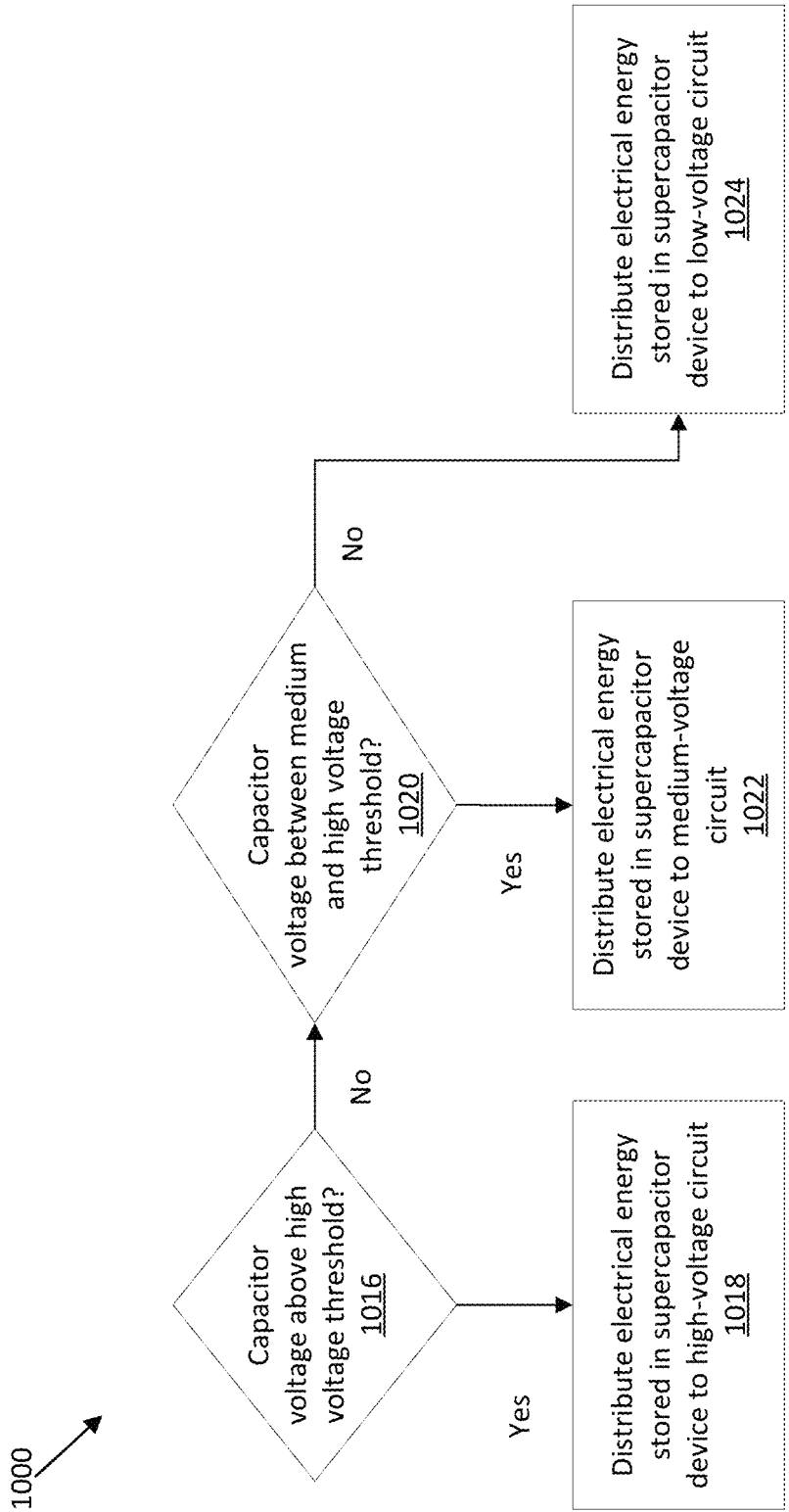
FIG. 10 is a flowchart diagram of one or more processes for storage and distribution of electrical energy using a supercapacitor device, according to one or more aspects described herein.

FIG. 10 is a flowchart diagram 1000 of one or more processes for storage and distribution of electrical energy using a supercapacitor device, according to one or more aspects described herein. In one example, flowchart diagram 1000 may be implemented using the system 100 described in relation to FIGS. 1A-1D.

Decision block 1016 may execute one or more processes to determine an output voltage from the system supercapacitor. Specifically, one or more processes to be executed at block 1016 to determine whether an output voltage from the supercapacitor device is above a high-voltage threshold. If the output voltage is above a high-voltage threshold, flowchart 1000 may proceed to block 1018. Accordingly, one or more processes may be executed at block 1018 to set the system into a high-voltage distribution mode. When in the high-voltage distribution mode, one or more processes may be executed at block 1018 to transmit electrical energy stored within the supercapacitor device, such as device 108, to the motor system, such as system 106.

If, at decision block 1016, the output voltage from the supercapacitor device is below a high-voltage threshold, the flowchart 1000 may proceed to decision block 1020. At block 1020, the system may execute one or more processes to determine whether the output voltage from the supercapacitor device is between a medium-voltage threshold and the high-voltage threshold. If it is determined that the output voltage is between the medium-voltage threshold and the high-voltage threshold, flowchart may proceed to block 1022. At block 1022, one or more processes may be executed to set the system into a medium-voltage distribution mode, and distribute electrical energy stored in the supercapacitor device to the medium-voltage circuit. If, however, at decision block 1020, it is determined that the capacitor output voltage is not between the medium-voltage threshold and the high-voltage threshold, flowchart 1000 may proceed to block 1024. At block 1024, one or more processes may be executed to set the system into a low-voltage distribution mode, and distribute electrical energy stored in the supercapacitor device to the low-voltage circuit.

The following table provides a sample state summary of the different states of switches 122, 124, and 126 (referred to as SW 122, SW 124, and SW 126 in the table), the different states of the power systems including the electrical energy supply device 104 (referred to as "EE Dev" in the table), the capacitor device 108 (referred to as "Cap" in the table), and the battery 118 (referred to as "Bat." in the table), and the power consuming devices including the motor system 106 (referred to as "Motor" in the table), the accessories 120, and the low voltage accessories 132. For reference, the capacitor device 108 is described generally as having five states (voltage states referred to as "Cap V" in the table) represented as follow: "0" for voltages below the minimum voltage level required by the low voltages accessories 132; "LV" for voltages meeting the minimum voltage requirements of the low voltage accessories 132 but below the minimum voltage requirements of the accessories 120; "HV" for voltages meeting the minimum voltage requirements of the accessories 120 but below the minimum voltage requirements of the motor system 106; "M" for voltages meeting the minimum voltage requirements of the motor system 106 but not at the maximum voltage of the capacitor device; and "MAX" for the maximum voltage of the capacitor. Three general operation modes are shown including: "idle/coasting"—when the motor system 106 is not consuming or generating power; "accelerating"—when the motor system 106 is consuming power; and "braking"—when the motor system is generating power. It is appreciated that different operating states are possible—e.g., including other items and systems and/or to address various optimizations/customizations to improve the harvesting and reuse of energy.

TABLE 1

| Op. ID | Op. Mode | EE Device | Cap | Cap V | Motor Power | HV Power From | LV Power From | SW 122 | SW 124 | SW 126 |
|---|---|---|---|---|---|---|---|---|---|---|
| 0 | Idle/Coasting | Gen or Off | — | 0 | — | EE Dev/Bat. | EE Dev/Bat. | — | — | X |
| 1 | Idle/Coasting | Gen or Off | Discharge | LV | — | EE Dev/Bat. | Cap | — | On | On |
| 2 | Idle/Coasting | — | Discharge | HV | — | Cap | Cap | — | On | On |
| 3 | Idle Coasting | — | Discharge | M | — | Cap | Cap | — | On | On |
| 4 | Idle/Coasting | — | Discharge | MAX | — | Cap | Cap | — | On | On |
| 5 | Acc. | Gen or Off | — | 0 | EE Dev/Bat. | EE Dev/Bat. | EE Dev/Bat. | — | — | X |
| 6 | Acc. | Gen or Off | Discharge | LV | EE Dev/Bat. | EE Dev/Bat. | Cap | — | On | On |
| 7 | Acc. | Gen or Off | Discharge | HV | EE Dev/Bat. | Cap | Cap | — | On | On |
| 8 | Acc. | — | Discharge | M | From Cap | Cap | Cap | On | On | On |
| 9 | Acc. | — | Discharge | MAX | From Cap | Cap | Cap | On | On | On |
| 10 | Braking | — | Charge | 0 | Generating | Motor | Motor | On | — | X |
| 11 | Braking | — | Charge | LV | Generating | Motor | Cap | On | On | On |
| 12 | Braking | — | Charge | HV | Generating | Cap | Cap | On | On | On |
| 13 | Braking | — | Charge | M | Generating | Cap | Cap | On | On | On |
| 14 | Braking | — | Discharge | MAX | Generating | Cap | Cap | — | On | On |

Figure 11:
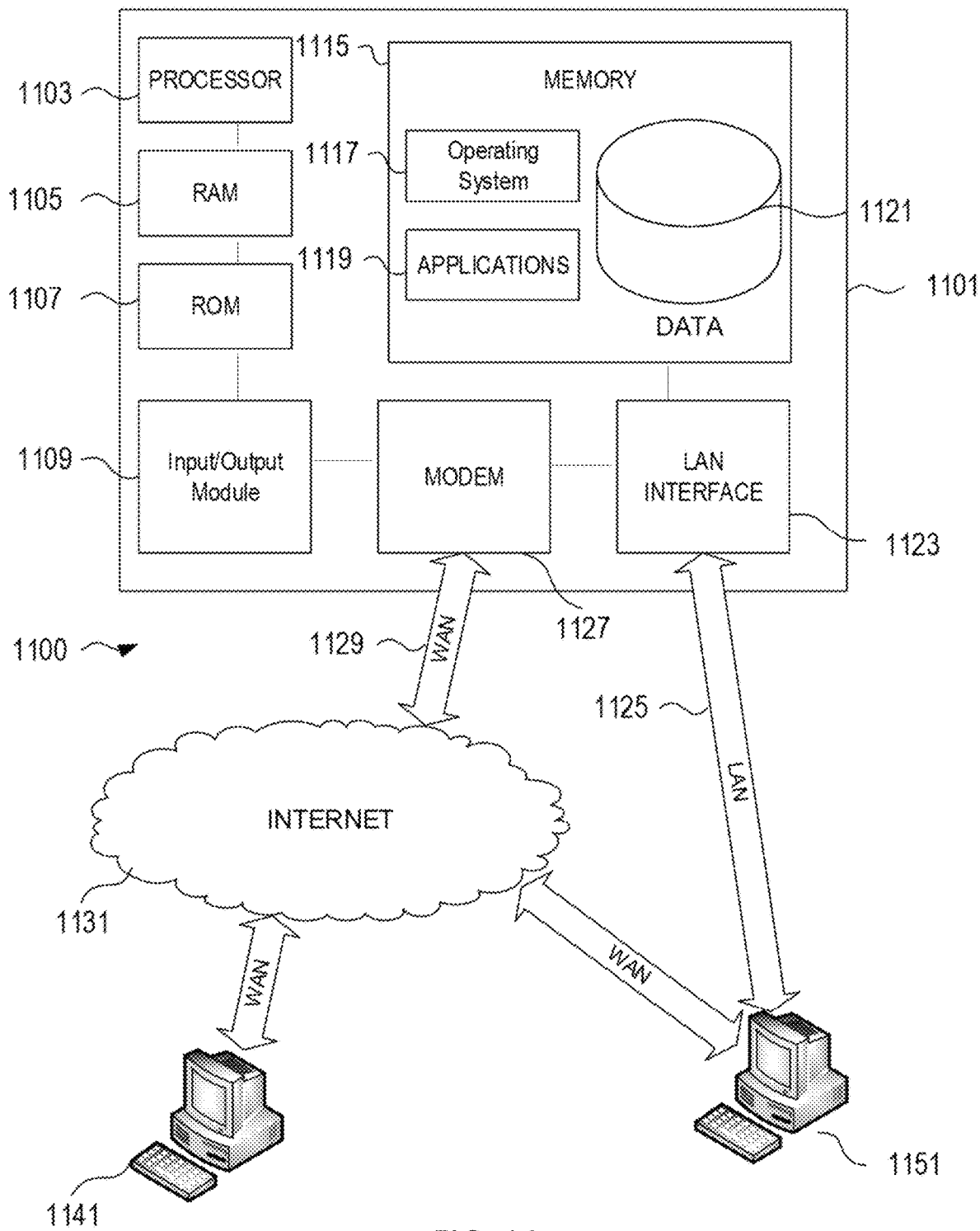
FIG. 11 shows an illustrative operating environment in which various aspects of the disclosure may be implemented, according to one or more aspects described herein.

The system controller, e.g., part of element 132, may be configured to control the various components described within system 100. This system controller 132 may be implemented as one or more network-linked computer devices, such as device 1101 from FIG. 11. Thus, the system controller 132 may be implemented on consolidated computing hardware, such as computing device 1101, at a single geographic location, and/or on a single integrated circuit, and the like. In another example, the system controller 132 may be implemented across multiple computing devices at a common, or dispersed geographic locations. In one example, the device 1101 may be in communication with devices 1141 and 1151 using one or more networking technologies (1125, 1129, and/or 1131) described in further detail in the description that follows.

In one example implementation, computing device 1101 may have a processor 1103 for controlling overall operation of device 1101 and its associated components, including RAM 1105, ROM 1107, an input/output (I/O) module 1109, and memory 1115. In one example, as will be apparent to those of ordinary skill in the art, memory 1115 may include any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 1115 may comprise a non-transitory computer-readable medium that may communicate instructions to processor 1103 to be executed.

I/O module 1109 may include a microphone, keypad, touch screen, and/or stylus through which a user of the computing device 1101 may provide input, and may also include one or more of a speaker for providing audio output and a video display device for providing textual, audiovisual, and/or graphical output. Software may be stored within memory 1115 and/or storage to provide instructions to the processor 1103 for allowing the computing device 1101 to perform various functions. For example, memory 1115 may store software used by the computing device 1101, such as an operating system 1117, application programs 1119, and an associated database 1121. The processor 1103 and its associated components may allow the computing device 1101 to run a series of computer-readable instructions to process and format data.

The computing device 1101 may operate in a networked environment supporting connections to one or more remote computers, such as computing devices 1141 and 1151. In one example, the computing devices 1141 and 1151 may be personal computers or servers that include many, or all, of the elements described above relative to the computing device 1101. Specifically, the computing device 1141 may represent one or more elements of a remote environment and computing device 1151 may represent one or more elements of a destination environment. Alternatively, computing device 1141 and/or 1151 may be a data store that is affected by the operation of the computing device 1101. The network connections depicted in FIG. 11 include a local area network (LAN) 1125 and a wide area network (WAN) 1129, but may also include other networks. When used in a LAN networking environment, the computing device 1101 is connected to the LAN 1125 through a network interface or adapter 1123. When used in a WAN networking environment, the computing device 1101 may include a modem 1127 or other means for establishing communications over the WAN 1129, such as the Internet 1131. It will be appreciated that the network connections shown are illustrative and other means of establishing a communications link between the computers may be used. In one implementation, the various elements described in relation to the system controller 132 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 601, 641, and/or 651 may be wired or wireless, and may utilize Wi-Fi, a cellular network, Bluetooth, infrared communication, or an Ethernet cable, among many others.

An application program 1119 used by the computing device 1101 according to an illustrative embodiment of the disclosure may include computer-executable instructions for invoking functionality related to the system controller 132. The computing device 601 and/or the other devices 1141 or 1151 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the electrical energy storage and distribution system 100 is configured to increase the energy efficiency of a device into which it is integrated. In one example, the system 100 increases energy efficiency by utilizing a higher range of the energy storage capacity of a supercapacitor device by selectively setting the system 100 into one of multiple different operational modes that direct electrical energy from the supercapacitor device to different elements of the system, based upon the output voltage of the supercapacitor. Accordingly, the system 100 a be configured to recover/store electrical energy generated by a motor system with greater efficiency, and without requiring a high capacity battery pack to be connected to the system 100. As such, the system 100 may be used to save cost and mass/weight associated with a high capacity battery pack for a vehicle. This mass saving may further increase into which the system 100 is integrated.

Certain elements of the various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes an electrical energy storage and distribution system for a vehicle, which further includes a first switch and a high-voltage circuit. The high-voltage circuit further includes an electric motor system that may be configured to convert electrical energy into kinetic energy during a drive mode, and to convert kinetic energy into electrical energy during a generator mode. The high-voltage circuit may also include an electrical energy supply device that may be connected to the electric motor system and configured to supply electrical energy to the electric motor system during the drive mode. The high-voltage circuit may also include a supercapacitor device connected to the electric motor system through the first switch. The system may also include a medium-voltage circuit that has a power distribution device connected to a battery. A bidirectional DC-to-DC converter may be configured to connect the power distribution device and the electric motor system. A second switch and a first unidirectional DC-to-DC converter may be configured to allow current to flow, via the second switch, from the capacitor device to the power distribution device. The system may also include a second unidirectional DC-to-DC converter and a low-voltage circuit connected, via the second unidirectional DC-to-DC converter, to the medium-voltage circuit. The system may include a third switch, such that the second unidirectional DC-to-DC converter may be configured to allow current to flow from the high-voltage circuit to the low-voltage circuit, and such that the low-voltage circuit may be connected, via the second unidirectional DC-to-DC converter and via the third switch, to the capacitor device of the high-voltage circuit.

The energy storage and distribution system may be further configured to be selectively set into one of the plurality of operational modes, with the plurality of operational modes including: a disconnected operational mode, an energy recovery operational mode, a high-voltage distribution mode, a medium-voltage distribution mode, and a low-voltage distribution mode. When the energy storage and distribution system is set into the disconnected operational mode, the first switch, the second switch, and the third switch may be set in an open configuration such that the supercapacitor device may be disconnected from the electric motor system, the medium-voltage circuit, and the low-voltage circuit. When the energy storage and distribution system is set into the energy recovery operational mode, the first switch may be set in a closed configuration, and the second switch and the third switch may be set in an open configuration, such that the supercapacitor device may be charged by electrical energy generated by the electric motor system operating in the generator mode. When the energy storage and distribution system is set into the high-voltage distribution mode, an output voltage of the supercapacitor device may be above a high-voltage threshold, the first switch may be set in a closed configuration, and the second switch and the third switch are set in an open configuration, such that the supercapacitor device transmits electrical energy to the electric motor system and to the bidirectional DC-to-DC converter. When the energy storage and distribution system is set into the medium-voltage distribution mode, an output voltage of the supercapacitor device may be between a medium-voltage threshold and the high-voltage threshold. The first switch may be set in the open configuration, the second switch may be set in a closed configuration, and the third switch may be set in the open configuration, such that the supercapacitor device transmits electrical energy to the first unidirectional DC-to-DC converter. When the energy storage and distribution system is set into the low-voltage distribution mode, an output voltage of the supercapacitor device may be below the medium-voltage threshold, the first switch may be set in the open configuration, the second switch may be set in the closed configuration, and the third switch may be set in the closed configuration, such that the supercapacitor device transmits electrical energy to the second unidirectional DC-to-DC converter.

The high-voltage distribution mode may be used to provide electrical energy to the electric motor system when accelerating the electric motor system from rest.

The electric motor system may include an AC motor and a motor inverter.

The electric motor system may include a DC motor and a DC motor voltage control device.

The high-voltage threshold may be 500 V and the medium-voltage threshold may be 200 V.

The electrical energy supply device may be a fuel-cell, a battery, a photovoltaic panel and/or an internal combustion engine.

Storage of energy in the supercapacitor device to a full capacitor energy level while in the energy recovery operational mode, and use of energy stored in the supercapacitor device in the high-voltage distribution mode, the medium-voltage distribution mode, and the low-voltage distribution mode to a depleted capacitor energy level utilizes at least 90% of a total energy storage capacity of the supercapacitor device.

In another aspect, a system may include a first switch and a first voltage circuit. The first voltage circuit may include an electric motor system that may be configured to convert electrical energy into kinetic energy during a drive mode, and to convert kinetic energy into electrical energy during a generator mode. The first voltage circuit may also include an electrical energy supply device that may be connected to the electric motor system and configured to supply electrical energy to the electric motor system during the drive mode. The first voltage circuit may also include capacitor device that may be connected to the electric motor system through the first switch. The system may also include a second voltage circuit that has a power distribution device connected to a battery. A bidirectional DC-to-DC converter may be configured to connect the power distribution device and the electric motor system. The system may also include a second switch, and a unidirectional DC-to-DC converter configured to allow current to flow, via the second switch, from the capacitor device to the second voltage circuit.

The system may be further configured to be selectively set into one of the plurality of operational modes, with the plurality of operational modes including: a disconnected operational mode, an energy recovery operational mode, a first distribution mode, and a second distribution mode. When the system is set into the disconnected operational mode, the first switch and the second switch are set in an open configuration such that the capacitor device may be disconnected from the electric motor system, the first voltage circuit, and the second circuit. When the system is set into the energy recovery operational mode, the first switch may be set in a closed configuration, and the second switch may be set in an open configuration, such that the capacitor device may be charged by electrical energy generated by the electric motor system operating in the generator mode. When the system is set into the first distribution mode, an output voltage of the capacitor device may be above a voltage threshold, the first switch may be set in a closed configuration, and the second switch may be set in an open configuration, such that the capacitor device transmits electrical energy to the electric motor system and to the bidirectional DC-to-DC converter. When the system is set into the second distribution mode, an output voltage of the capacitor device may be below the voltage threshold. The first switch may be set in the open configuration, the second switch may be set in a closed configuration, such that the capacitor device transmits electrical energy to the unidirectional DC-to-DC converter.

It will be understood that the invention is not to be limited to the embodiments disclosed herein. For example, the first distribution mode may be used to provide electrical energy to the electric motor system when accelerating the electric motor system from rest. In another example, the electric motor system may include an AC motor and a motor inverter. In yet another example, the electric motor system may include a DC motor and a DC motor voltage control device. In some examples, the voltage threshold may be 300 V. Also, the energy supply device may be a fuel cell.

In one aspect, this disclosure includes a system that further includes a controller, a high voltage electrical motor, a medium voltage system, a low voltage system, and a capacitive storage system. The system may additionally include a bidirectional direct current (DC)-to-DC converter that has a first terminal connected to the high voltage electrical motor and a second terminal connected to the medium voltage system. The system includes a first switch connecting the first terminal to the capacitive storage system and a first unidirectional DC-to-DC converter that has a third terminal and a fourth terminal, such that the third terminal is connected to the second terminal. The system includes a second switch that connects the fourth terminal to the capacitive storage system, and a second unidirectional DC-to-DC converter that has a fifth terminal, sixth terminal, and a seventh terminal, such that the fifth terminal is connected to the medium voltage system, and the sixth terminal is connected to the low-voltage system. The system additionally includes a third switch connecting the seventh terminal to the capacitive storage system, such that the controller controls the first switch, the second switch, and the third switch to selectively charge the capacitive storage system, power the high-voltage electrical motor, or the medium voltage system, or power the low-voltage system.

The system may be further configured to be selectively set into one of the plurality of operational modes, with the plurality of operational modes including: a disconnected operational mode, an energy recovery operational mode, a high-voltage distribution mode, a medium-voltage distribution mode, and a low-voltage distribution mode. When the system is set into the disconnected operational mode, the first switch, the second switch, and the third switch may be set in an open configuration such that the capacitive storage system may be disconnected from the high-voltage electrical motor, the medium-voltage circuit and the low-voltage circuit. When the system is set into the energy recovery operational mode, the first switch may be set in a closed configuration, and the second switch and the third switch may be set in an open configuration, such that the capacitive storage system may be charged by electrical energy generated by the high-voltage electrical motor operating in a generator mode. When the system is set into the high-voltage distribution mode, an output voltage of the capacitive storage system may be above a high-voltage threshold, the first switch may be set in a closed configuration, and the second switch and the third switch are set in an open configuration, such that the capacitive storage system transmits electrical energy to the electric motor system and to the bidirectional direct current (DC)-to-DC converter. When the system is set into the medium-voltage distribution mode, an output voltage of the capacitive storage system may be between a medium-voltage threshold and the high-voltage threshold. The first switch may be set in the open configuration, the second switch may be set in a closed configuration, and the third switch may be set in the open configuration, such that the capacitive storage system transmits electrical energy to the first unidirectional DC-to-DC converter. When the system is set into the low-voltage distribution mode, an output voltage of the capacitive storage system may be below the medium-voltage threshold, the first switch may be set in the open configuration, the second switch may be set in the closed configuration, and the third switch may be set in the closed configuration, such that the capacitive storage system transmits electrical energy to the second unidirectional DC-to-DC converter.

The high-voltage distribution mode may be used to provide electrical energy to the high voltage electrical motor when accelerating the high voltage electrical motor from rest.

The high voltage electrical motor may include an AC motor and a motor inverter.

The high voltage electrical motor may include a DC motor and a DC motor voltage control device.

The high-voltage threshold may be 500 V and the medium-voltage threshold may be 200 V.

The electrical energy supply device may be a fuel-cell, a battery, a photovoltaic panel and/or an internal combustion engine.

Storage of energy in the capacitive storage system to a full capacitor energy level while in the energy recovery operational mode, and use of energy stored in the capacitive storage system in the high-voltage distribution mode, the medium-voltage distribution mode, and the low-voltage distribution mode to a depleted capacitor energy level utilizes at least 90% of a total energy storage capacity of the supercapacitor device.

In another aspect, a method for electrical energy storage and distribution for a vehicle may include connecting an electric motor system and an electrical energy supply device within a high-voltage circuit, and connecting a supercapacitor device to the motor system within the high-voltage circuit via a first switch. The method may also include connecting a power distribution device and a battery within a medium-voltage circuit, and connecting the electric motor system and the electrical energy supply device to the power distribution device via a bidirectional DC-to-DC converter. The method may include connecting the supercapacitor device to the low-voltage circuit via the second switch and a third switch. The method may also include storing electrical energy generated by the motor system when set into a generator mode by setting the first switch into a closed configuration and the second and third switches into open configurations. The method may further include distributing electrical energy stored in the supercapacitor device to the electric motor system when set in a drive mode by setting the first switch into a closed configuration and the second and third switches into open configurations, and distributing electrical energy stored in the supercapacitor device to the medium-voltage circuit by setting the first switch into an open configuration, the second switch into a closed configuration, and the third switch into an open configuration. Further, electrical energy stored in the supercapacitor device may be distributed to the low-voltage circuit by setting the first switch into an open configuration, the second switch into an open configuration, and the third switch into a closed configuration.

In yet another aspect, a method may include charging, via a first switch and by an electric motor, a supercapacitor during a first interval, providing electrical power, via the first switch and by the supercapacitor, to the electric motor during a second interval. The method may also include providing electrical power, via a second switch, via a first unidirectional direct current (DC)-to-DC converter, and by the supercapacitor, to a high voltage accessory during a third interval, and providing electrical power, via the second switch, via the third switch, via a second unidirectional (DC)-to-DC converter, and by the supercapacitor, to a high-voltage accessory during a fourth interval.

Accordingly, it will be understood that the invention is not to be limited to the embodiments disclosed herein, but is to be understood from the following claims, which are to be interpreted as broadly as allowed under the law.

What is claimed is:

1. A system comprising:
   a controller;
   a high voltage electrical motor; a medium voltage system;
   a low voltage system;
   a capacitive storage system;
   a bidirectional direct current (DC)-to-DC converter comprising a first terminal connected to the high voltage electrical motor and a second terminal connected to the medium voltage system;
   a first switch connecting the first terminal to the capacitive storage system;
   a first unidirectional DC-to-DC converter comprising a third terminal and a fourth terminal, wherein the third terminal is connected to the second terminal;
   a second switch connecting the fourth terminal to the capacitive storage system;
   a second unidirectional DC-to-DC converter comprising a fifth terminal, a sixth terminal, and a seventh terminal, wherein the fifth terminal is connected to the medium voltage system, and wherein the sixth terminal is connected to the low voltage system; and
   a third switch connecting the seventh terminal to the capacitive storage system,
      wherein the controller controls the first switch, the second switch, and the third switch to selectively charge the capacitive storage system, power the high voltage electrical motor, power the medium voltage system, or power the low voltage system.

2. The system of claim 1, wherein the system is configured to be selectively set into one of a plurality of operational modes, the plurality of operational modes comprising:
   a disconnected operational mode, wherein when the system is set into the disconnected operational mode, the first switch, the second switch, and the third switch are set in an open configuration such that the capacitive storage system is disconnected from the high voltage electrical motor, the medium voltage system, and the low voltage system;
   an energy recovery operational mode, wherein when the system is set into the energy recovery operational mode, the first switch is set in a closed configuration, and the second switch and the third switch are set in an open configuration, such that the capacitive storage system is charged by electrical energy generated by the high voltage electrical motor operating in a generator mode;
   a high-voltage distribution mode, wherein when the system is set into the high-voltage distribution mode, an output voltage of the capacitive storage system is above a high-voltage threshold, the first switch is set in a closed configuration, and the second switch and the third switch are set in an open configuration, such that the capacitive storage system transmits electrical energy to the high voltage electrical motor and to the bidirectional direct current (DC)-to-DC converter;
   a medium-voltage distribution mode, wherein when the system is set into the medium-voltage distribution mode, an output voltage of the capacitive storage system is between a medium-voltage threshold and the high-voltage threshold, the first switch is set in the open configuration, and the second switch is set in a closed configuration, and the third switch is set in the open configuration, such that the capacitive storage system transmits electrical energy to the first unidirectional DC-to-DC converter; and
   a low-voltage distribution mode, wherein when the system is set into the low-voltage distribution mode, an output voltage of the capacitive storage system is below the medium-voltage threshold, the first switch is set in the open configuration, the second switch is set in the closed configuration, and the third switch is set in the closed configuration, such that the capacitive storage system transmits electrical energy to the second unidirectional DC-to-DC converter.

3. The system of claim 2, wherein the high-voltage distribution mode is used to provide electrical energy to the high voltage electrical motor when accelerating the high voltage electrical motor from rest.

4. The system of claim 2, wherein the high-voltage threshold is 500 V.

5. The system of claim 2, wherein the medium-voltage threshold is 200 V.

6. The system of claim 2, wherein storage of energy in the capacitive storage system to a full capacitor energy level while in the energy recovery operational mode, and use of energy stored in the capacitive storage system in the high-voltage distribution mode, medium-voltage distribution mode, and low-voltage distribution mode to a depleted capacitor energy level utilizes at least 90% of a total energy storage capacity of the capacitive storage system.

7. The system of claim 1, wherein the high voltage electrical motor comprises an AC motor and a motor inverter.

8. The system of claim 1, wherein the high voltage electrical motor comprises a DC motor and a DC motor voltage control device.

9. The system of claim 1, further comprising an electrical energy supply device.

10. The system of claim 9, wherein the electrical energy supply device is a battery.

11. The system of claim 9, wherein the electrical energy supply device is an internal combustion engine.

12. The system of claim 9, wherein the electrical energy supply device is fuel cell.

13. A system, comprising:
a first switch;
a first voltage circuit, comprising:
   an electric motor system, configured to convert electrical energy into kinetic energy during a drive mode, and to convert kinetic energy into electrical energy during a generator mode; and
   an electrical energy supply device, connected to the electric motor system, configured to supply electrical energy to the electric motor system during the drive mode;
   a capacitor device, connected to the electric motor system through the first switch;
a second voltage circuit, comprising:
   a power distribution device connected to a battery;
a bidirectional DC-to-DC converter configured to connect the power distribution device and the electric motor system;
a second switch; and
a unidirectional DC-to-DC converter configured to allow current to flow, via the second switch, from the capacitor device to the second voltage circuit.

14. The system of claim 13, wherein the system is configured to be selectively set into one of a plurality of operational modes, the plurality of operational modes comprising:

a disconnected operational mode, wherein when the system is set into the disconnected operational mode, the first switch and the second switch are set in an open configuration such that the capacitor device is disconnected from the electric motor system, the first voltage circuit, and the second voltage circuit;

an energy recovery operational mode, wherein when the system is set into the energy recovery operational mode, the first switch is set in a closed configuration, and the second switch is set in an open configuration, such that the capacitor device is charged by electrical energy generated by the electric motor system operating in the generator mode;

a first distribution mode, wherein when the system is set into the first distribution mode, an output voltage of the capacitor device is above a voltage threshold, the first switch is set in a closed configuration, and the second switch is set in an open configuration, such that the capacitor device transmits electrical energy to the electric motor system and to the bidirectional DC-to-DC converter;

a second distribution mode, wherein when the system is set into the second distribution mode, an output voltage of the capacitor device is below the voltage threshold, the first switch is set in the open configuration, and the second switch is set in a closed configuration, such that the capacitor device transmits electrical energy to the unidirectional DC-to-DC converter.

15. The system of claim 14, wherein the first distribution mode is used to provide electrical energy to the electric motor system when accelerating the electric motor system from rest.

16. The system of claim 14, wherein the voltage threshold is 300 V.

17. The system of claim 13, wherein the electric motor system comprises an AC motor and a motor inverter.

18. The system of claim 13, wherein the electric motor system comprises a DC motor and a DC motor voltage control device.

19. The system of claim 13, wherein the energy supply device is a fuel cell.

20. A method comprising:
charging, via a first switch and by an electric motor, a supercapacitor during a first interval; providing electrical power, via the first switch and by the supercapacitor, to the electric motor during a second interval;
providing electrical power, via a second switch, via a first unidirectional direct current (DC)-to-DC converter, and by the supercapacitor, to a medium voltage accessory during a third interval; and
providing electrical power, via the second switch, via a third switch, via a second unidirectional direct current (DC)-to-DC converter, and by the supercapacitor, to a low voltage accessory during a fourth interval.

* * * * *